(12) United States Patent
Sambasivam

(10) Patent No.: US 11,776,766 B1
(45) Date of Patent: Oct. 3, 2023

(54) SELECTIVELY DESIGNED HIERARCHICAL COPPER-COBALT OXYSULFIDE NANOARCHITECTURES FOR HIGH-RATE HYBRID SUPERCAPACITORS

(71) Applicant: United Arab Emirates University, Al Ain (AE)

(72) Inventor: Sangaraju Sambasivam, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/100,279

(22) Filed: Jan. 23, 2023

(51) Int. Cl.
  *H01G 11/32* (2013.01)
  *H01G 11/26* (2013.01)
  *C01G 51/00* (2006.01)

(52) U.S. Cl.
  CPC .......... *H01G 11/32* (2013.01); *C01G 51/006* (2013.01); *H01G 11/26* (2013.01); *C01P 2002/72* (2013.01); *C01P 2002/85* (2013.01); *C01P 2004/03* (2013.01); *C01P 2004/04* (2013.01); *C01P 2004/64* (2013.01); *C01P 2006/40* (2013.01)

(58) Field of Classification Search
  CPC ..................................................... H01G 11/32
  See application file for complete search history.

(56) References Cited

U.S. PATENT DOCUMENTS 9,649,622 B1 *  5/2017  Kuo ...................... B01J 23/825
9,771,262 B1 *  9/2017  Kuo ...................... B01J 27/051

OTHER PUBLICATIONS

Tao Chen & Liming Dai, "Carbon nanomaterials for high-performance supercapacitors", Elsevier, Materials Today, 2013, vol. 16, Nos. 7/8, pp. 272-280, 9 pages.
Wang et al., "Electrochemical capacitors: mechanism, materials, systems, characterization and applications", The Royal Society of Chemistry, Chem. Soc. Rev., vol. 45, Issue 21, pp. 5925-5950, 26 pages.
Dubal et al., "Hybrid energy storage: the merging of battery and supercapacitor chemistries", The Royal Society of Chemistry, Chem. Soc. Rev., vol. 44, Issue 7, 2015, pp. 1777-1790, 14 pages.

(Continued)

*Primary Examiner* — William D Young
(74) *Attorney, Agent, or Firm* — Hayes Soloway PC

(57) ABSTRACT

The invention discloses a method of fabricating a copper-cobalt (Cu—Co) oxysulfide nanoarchitecture, the method comprising dissolving cobalt nitrate hexahydrate and copper nitrate in de-ionized (DI) water forming a growth solution, mixing disodium thiosulfate and urea to the formed growth solution, immersing a pre-cleaned Ni-foam substrate in the growth solution forming a total solution and transferring the total solution to a sealed glass bottle. The method further comprises heating the sealed glass bottle in an oil bath, thereby forming a flower-like morphology sample of copper-cobalt oxysulfide and cleaning and drying the formed sample of copper-cobalt oxysulfide. Also disclosed is a hybrid supercapacitor (HSC) comprising copper-cobalt (Cu—Co) oxysulfide nanosheets (NFs) on Ni foam as positive electrode; and copper-cobalt (Cu—Co) oxysulfide nanosheets (NFs) on porous carbon as negative electrode.

8 Claims, 23 Drawing Sheets

(56) References Cited

OTHER PUBLICATIONS

Augustyn et al., "Pseudocapacitive oxide materials for high-rate electrochemical energy storage", Energy & Environmental Science, 2014, vol. 7, Issue 5, pp. 1597-1614, 18 pages.

P. Simon & Y. Gogotsi, "Materials for electrochemical capacitors", Nature Materials, Macmillan Publishers Limited, 2008, vol. 7, pp. 845-854, 10 pages.

Liu et al., "Transition metal based battery-type electrodes in hybrid supercapacitors: a review", Elsevier, Energy Storage Materials, 2020, vol. 28, pp. 122-145, 84 pages.

Li et al., "Facile synthesis of bimetal nickel cobalt phosphate nanostructures for high-performance hybrid supercapacitors", Elsevier, ScienceDirect, Journal of Alloys and Compounds, 2022, vol. 893, Issue 162340, 9 pages.

Salunkhe et al., "A Concept for Asymmetric Supercapacitors Using 3D Nanoporous Carbon and Cobalt Oxide Electrodes Synthesized from Single Metal Organic Framework", ACS Publications, ACS Nano, 2015, vol. 9, Issue 6, pp. 6288-6296, 28 pages.

Liu, "Nano-aggregates of cobalt nickel oxysulfide as a high-performance elec- trode material for supercapacitors", RSC Publishing, Nanoscale, 2013, vol. 5, Issue 23, pp. 11615-11619, 6 pages.

Liu et al., "Flower-like manganese-cobalt oxysulfide supported on Ni foam as a novel faradaic electrode with commendable performance", Elsevier, Electrochimica Acta , 2016, vol. 191, pp. 916-922, 27 pages.

Nagaraju et al., "Wearable fabrics with self-branched bimetallic layered double hydroxide coaxial nanostructures for hybrid supercapacitors", ACS Publications, ACS Nano, 2017, vol. 11, Issue 11, pp. 10860-10874, 46 pages.

Kumar et al., "Facile synthesis of highly efficient construction of tungsten disulfide/iron cobaltite nanocomposite grown on nickel foam as a battery-type energy material for electrochemical supercapacitors with superior performance", Elsevier, Journal of Colloid and Interface Science, 2022, vol. 609, pp. 434-446, 13 pages.

Tran et al., "Highly efficient overall water splitting over a porous interconnected network by nickel cobalt oxysulfide interfacial assembled $Cu@Cu_2S$ nanowires", Journal of Materials Chemistry A, 2020, Issue 29, pp. 14746-14756, 14 pages.

Wang et al., "Insight into nickel-cobalt oxysulfide nanowires as advanced anode for sodium-ion capacitors", WileyOnline Library, Advanced Energy Materials, 2021, vol. 11, Issue 18, 9 pages.

Wang et al., "Facile synthesis of flower-like copper-cobalt sulfide as binder-free faradaic electrodes for supercapacitors with improved electro-chemical properties", National Library of Medicine, Nanomaterials 2017, vol. 7, Issue 6, 9 pages.

Loussot et al., "Amorphous cobalt oxy-sulfide as a hydrogen trap", ACSPublications, Chem. Materials, 2006, vol. 18, Issue 24, pp. 5659-5668, 10 pages.

Nagaraju et al., "An agriculture-inspired nanostrategy towards flexible and highly efficient hybrid supercapacitors using ubiquitous substrates", Nano Energy, 2019, vol. 66, 41 pages.

Pallavolu et al., "Self-assembled and highly faceted growth of Mo and V doped ZnO nanoflowers for high-performance supercapacitors", Elsevier, Journal of Alloys and Compounds, 2021, vol. 886, Issue 161234, 12 pages.

Chen et al., "One-step electrodeposited nickel cobalt sulfide nanosheet arrays for high-performance asymmetric supercapacitors", ACS Nano, vol. 8, Issue No. 9, pp. 9531-9541, 11 pages.

Kong et al., "Homogeneous core-shell $NiCo_2S_4$ nanostructures supported on nickel foam for supercapacitors", Journal of Materials Chemistry A, 2015, Issue 23, pp. 12452-12460, 33 pages.

Zhang et al., "Electrochemically synthesis of nickel cobalt sulfide for high-performance flexible asymmetric supercapacitors", AdvancedScience, 2017, vol. 5, Issue 2, 1700375, 12 pages.

Shude Liu & Seong Chan Jun, "Hierarchical manganese cobalt sulfide core-shell nanostructures for high-performance asymmetric supercapacitors", Elsevier, Journal of Power Sources, 2017, vol. 342, pp. 629-637, 9 pages.

Nagaraju et al., "An integrated approach toward re-newable energy storage using rechargeable $Ag@Ni_{0.67}Co_{0.33}S$-based hybrid supercapacitors", 2019, Advanced Science News, Nano Micro, Small, 2019, vol. 25, Issue 16, 14 pages.

Du et al., "Preparation of nanoporous nick-elcopper sulfide on carbon cloth for high-performance hybrid supercapacitors", Electrochimica Acta, 2018, vol. 273, pp. 170-180, 38 pages.

* cited by examiner

SELECTIVELY DESIGNED HIERARCHICAL COPPER-COBALT OXYSULFIDE NANOARCHITECTURES FOR HIGH-RATE HYBRID SUPERCAPACITORS

FIELD OF THE INVENTION

The present invention relates to the field of designing high-performance cathode materials and more particularly to designing hierarchical copper-cobalt oxysulfide nanoarchitectures for high-rate hybrid supercapacitors.

BACKGROUND OF THE INVENTION

Background description includes information that will be useful in understanding the present invention. It is not an admission that any of the information provided herein is prior art or relevant to the presently claimed invention, or that any publication specifically or implicitly referenced is prior art.

Energy consumption across the globe is rapidly increasing to meet the present energy demand and the over-dependence on non-renewable, exhausting fossil fuels results in increasing pollution levels and an energy crisis. The alternative route is to use renewable sources such as solar, wind, and hydro energy but they require efficient energy storage devices. For the last three decades, batteries and supercapacitors are the most notable energy storage devices. Batteries involve various types of mechanisms such as intercalation/de-intercalation, conversion, and alloying/de-alloying and have higher energy density and cycle life. However, they are kinetically limited because of solid-state ion diffusion within the electrode material. Conversely, supercapacitor (SC) works based on the reactions that occur on the surface of the electrode (pseudo-capacitance) and electrode-electrolyte interfaces (EDLC). They possess high power density and a much higher cycle life compared to batteries. With high energy density values, batteries are more effective in long-lasting energy devices, while supercapacitors with faster charge/discharge are suitable for portable devices. The combination of EDLC (capacitive-type) and pseudo-capacitance (battery-type) in the same devices forms the hybrid supercapacitor (HSC) and they possess higher energy and power density values compared to normal supercapacitors. Numerous materials such as transition metal oxides, sulfides, phosphates, nitrides, and carbonaceous materials have been studied in HSCs.

Carbonaceous materials are the best-known capacitive-type materials, due to their higher electronic conductivity and large cycle life but they suffer from poor performance during the electro-chemical process. As opposed to carbonaceous materials, transition metal oxides show good electrochemical redox behavior and higher theoretical capacity, but they are limited by their low cyclic performance. Therefore, it is pivotal to develop advanced materials which can provide good cyclic performance, high capacity, and long cycle life, which is enviable for HSCs. Transition metal sulfides have been studied as efficient electrode materials for supercapacitors due to their superlative electronic conductivity compared with their oxide counterparts. In recent times, nano-structural materials with mixed metals and anions are reported to show more remarkable electrochemical performance than conventional materials. Previous studies have reported the hydrothermal synthesis of Co—Ni oxysulfide and have examined their electrochemical performance in supercapacitors. The as-synthesized Co—Ni oxysulfide nanoaggregates deliver a specific capacitance of 592 F/g at a current density value of 0.5 A $g^{-1}$ and capacity retention of 95% after 2000 cycles at 20 A $g^{-1}$.

Another study has reported the synthesis of floral nanostructures of Mn—Co oxysulfide supported on Ni-foam, which delivers a capacitance value of 490 C $g^{-1}$ at 2 A $g^{-1}$. The capacitance value obtained from the MnCo oxysulfide is higher than the MnCo oxide counterpart. Other studies have synthesized the Fe—V oxysulfide with different Fe—V atomic ratios via a simple electrodeposition method and showed improved performance in supercapacitors. Although several works have been focused on metal sulfides/oxysulfides, single-step and low-temperature assisted sulfurization methods have been rarely studied.

However, there is a need to develop a new approach to overcome the shortcomings of these traditionally implemented methods and to show better results.

SUMMARY OF THE INVENTION

Aspects of the disclosed embodiments seek to provide a method of designing hierarchical copper-cobalt oxysulfide nanoarchitectures for high-rate hybrid supercapacitors.

Embodiments of the present invention relates to a method of fabricating a copper-cobalt (Cu—Co) oxysulfide nanoarchitecture, the method comprising the steps of dissolving cobalt nitrate hexahydrate and copper nitrate in de-ionized (DI) water forming a growth solution, mixing disodium thiosulfate and urea to the formed growth solution, immersing a pre-cleaned Ni-foam substrate in the growth solution forming a total solution; and transferring the total solution to a sealed glass bottle.

In accordance with an embodiment of the present invention, the method further comprises heating the sealed glass bottle in an oil bath, thereby forming a flower-like morphology sample of copper-cobalt oxysulfide; and cleaning and drying the formed sample of copper-cobalt oxysulfide.

In accordance with another embodiment of the present invention, the formed sample of copper-cobalt oxysulfide is cleaned using de-ionized water and ethanol.

In accordance with another embodiment of the present invention, the formed sample of copper-cobalt oxysulfide comprises flower-like morphology.

In accordance with another embodiment of the present invention, the fabricated copper-cobalt (Cu—Co) oxysulfide nanoarchitecture is $Cu_{0.33}Co_{0.67}O_xS_y$.

In accordance with another embodiment of the present invention, 67 mM of cobalt nitrate hexahydrate and 33 mM of copper nitrate are dissolved in 50 ml of de-ionized (DI) water.

In accordance with another embodiment of the present invention, 300 mM of disodium thiosulfate and 100 mM of urea is mixed into the formed growth solution.

In accordance with another embodiment of the present invention, the Ni-foam substrate is pre-cleaned to eliminate oxide species on the Ni-foam substrate.

In accordance with another embodiment of the present invention, the sealed glass bottle is heated at 70° C. for 3 hours.

In accordance with another embodiment of the present invention, the formed sample of copper-cobalt oxysulfide is dried at 60° C. for 4 hours.

As another aspect of the present invention, a hybrid supercapacitor (HSC) comprising copper-cobalt (Cu—Co) oxysulfide nanosheets (NFs) on Ni foam as positive electrode; and copper-cobalt (Cu—Co) oxysulfide nanosheets (NFs) on porous carbon as negative electrode, is disclosed.

In accordance with an embodiment of the present invention, the hybrid supercapacitor (HSC) depicts nanoflower-like morphology of $Cu_{0.33}Co_{0.67}O_xS_y$ (nanoflowers).

In accordance with another embodiment of the present invention, the nanoflower-like morphology of $Cu_{0.33}Co_{0.67}O_xS_y$ provides active catalytic surface area for electrochemical redox reactions.

In accordance with another embodiment of the present invention, the positive and negative electrodes comprise intrinsic synergistic properties, which assist in enhancement of energy storage performance in supercapacitor batteries.

In accordance with another embodiment of the present invention, the hybrid supercapacitor (HSC) delivers a maximum area capacity of 462 $\mu Ah/cm^2$.

In accordance with another embodiment of the present invention, the hybrid supercapacitor (HSC) delivers a maximum energy density of 0.33 $mWh/cm^2$ at a power density of 2.1 $W/cm^2$.

In accordance with another embodiment of the present invention, the copper-cobalt (Cu—Co) oxysulfide nanosheets (NFs) electrode shows higher capacity retention of 95% even after 3000 cycles, indicating greater stability of the $Cu_{0.33}Co_{0.67}O_xS_y$-NFs.

Additional aspects of the invention will be set forth in part in the description which follows, and in part will be obvious from the description, or may be learned by practice of the invention.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4C show comparative CV curves at a constant scan rate of 20 mV s−1, discharge curves tested at 5 mA cm-2, and calculated areal and gravimetric capacity of $Cu_{0.33}Co_{0.67}O_xS_y$-NFs.

FIG. 4N is a schematic illustration of $Cu_{0.33}Co_{0.67}O_xS_y$-NFs decorated on Ni-foam demonstrating the electron flow and electrolyte diffusion during the electrochemical process.

FIGS. 5G-5H are schematic demonstrations of series-connected two HSCs and photographic images of corresponding devices energizing a wind fan.

Figure 1:
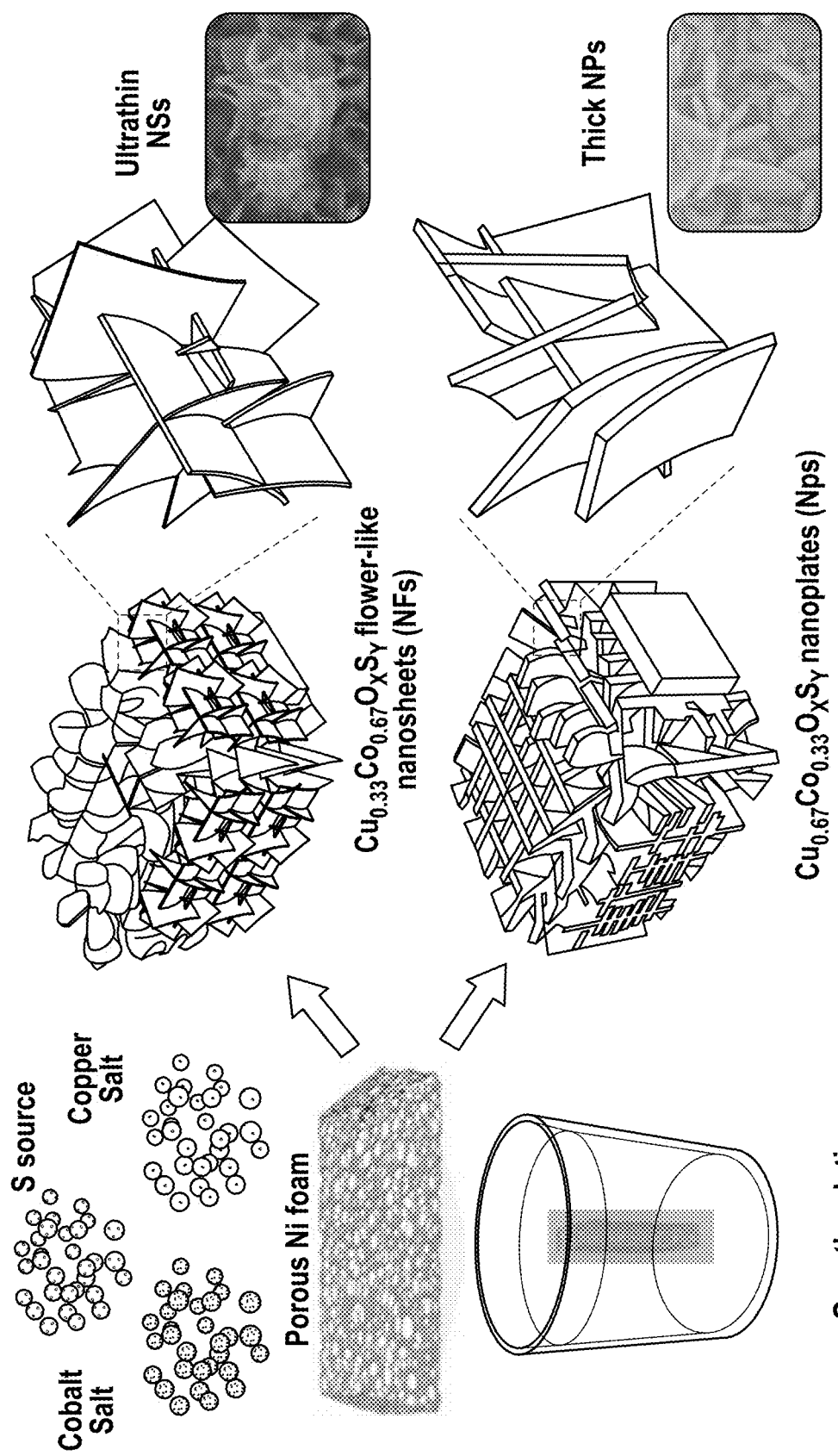
FIG. 1 is a schematic illustration for the synthesis of $Cu_{0.33}Co_{0.67}O_xS_y$-NFs and $Cu_{0.67}Co_{0.33}O_xS_y$-NPs on Ni-foam using a single-step wet-chemical method.

The foregoing and other objects, features and advantages of the present invention, as well as the invention itself, will be more fully understood from the following description of preferred embodiments, when read together with the accompanying drawings.

DETAILED DESCRIPTION OF THE DRAWINGS

The present invention relates to the field of designing high-performance cathode materials and more particularly to designing hierarchical copper-cobalt oxysulfide nano-architectures for high-rate hybrid supercapacitors.

The principles of the present invention and their advantages are best understood by referring to FIG. 1 to FIG. 5L. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

The present invention delas with a rational design of metal oxide-sulfide-based composite electrode materials with multi-functional nanoarchitectures, high electrochemical conductivity, and superior redox activity have attracted extensive attention in high-rate hybrid supercapacitors. Herein, the hierarchical binder-free copper-cobalt oxysulfide ($Cu_{0.33}Co_{0.67}O_xS_y$) nanoarchitectures with flower-like nanosheets and nanoplates are synthesized on Ni-foam for hybrid supercapacitors using a simple and low-cost wet chemical method. The $Cu_{0.33}Co_{0.67}O_xS_y$-NFs demonstrated a high specific capacity of 193 mAh/cm² (443.9 µAh/cm²) at current density of 3 mA cm 2, with excellent cycling performance of 95% even after 3000 charge-discharge cycles. In addition, an aqueous hybrid device was assembled using prepared $Cu_{0.33}Co_{0.67}O_xS_y$-NFs as positive and porous carbon as negative electrode, which demonstrated benchmark for energy storage properties. Specifically, the assembled device exhibited a high energy density of 0.33 mWh/cm² and a power density of 2.1 mW/cm² with high-capacity retention (91% after 5000 cycles at 20 mA cm 2). In view of practical applicability, the assembled hybrid devices can be able to power up a small wind fan for a long duration. The proposed cost-effective single-step approach in designing high-performance cathode materials provides a strategy for the design and manufacture of other ternary metal oxysulfides for high-performance energy storage devices.

The present invention focuses on a single-step approach of Cu—Co based oxysulfides without using any high-temperature assisted sulfurization process for hybrid supercapacitors. A simple, low-temperature synthesis of Cu—Co oxysulfide nanostructures on porous Ni-foam with different Cu—Co atomic ratios is disclosed. With the Cu—Co atomic ratio of 1:2, the obtained oxysulfide has a nanoflower-like morphology ($Cu_{0.33}Co_{0.67}O_xS_y$-NFs), while with 2:1 Cu—Co atomic ratio nanoplates ($Cu_{0.67}Co_{0.33}O_xS_y$-NPs) were obtained. Further, we investigated the electrochemical performance of these Cu—Co oxysulfides in hybrid supercapacitors. $Cu_{0.33}Co_{0.67}O_xS_y$-NFs outperforms $Cu_{0.67}Co_{0.33}O_xS_y$-NPs with improved electrochemical performance and cyclic stability.

In accordance with another embodiment of the present invention, materials used for the present invention include cobalt nitrate hexahydrate ($Co(NO_3)_2 \cdot 6H_2O$), copper nitrate ($Cu(NO_3)_2$), disodium thiosulfate ($Na_2S_2O_3$), and urea ($CON_2H_4$). Porous carbon and Ni-foam was further purchased, and all the chemical used in this work were used as such without further purification.

For the synthesis of $Cu_{0.33}Co_{0.67}O_xS_y$, calculated amounts of Cobalt nitrate hexahydrate (67 mM) and Copper nitrate (33 mM) were dissolved in 50 ml of de-ionized (DI) water. Next, 300 mM of disodium thiosulfate and 100 mM of urea were mixed into the above-growth solution. Prior to synthesis, the Ni foams slices were cleaned with 1 M HCl followed by DI water five times to eliminate the oxide species on the Ni-foam substrate. The pre-cleaned substrate was immersed in the growth solution and the total solution was transferred into the glass bottle with a tightly sealed cap. The glass bottle was kept in an oil bath and slowly heated at 70° C. for 3 h. Afterward, the sample was cleaned with DI water, and ethanol thoroughly and followed by drying at 60° C. for 4 hours. the final mass loading on the Ni foam was 2.3 mg/cm². For another set of $Cu_{0.33}Co_{0.67}O_xS_y$, the same process was used as followed in the above with the calculated amounts of Cobalt nitrate hexahydrate (33 mM) and Copper nitrate (67 mM). The final mass loading of this sample was 2.4 mg/cm². Further, these samples were used for characterization and finding the electrochemical properties.

Structural properties of the synthesized powders were characterized by X-ray diffraction and Raman spectroscopy techniques. The XRD was operated in the 2θ=10-80° range with a Cu Kα (λ=0.15406 nm) radiation. The morphological properties of the spinel structured $Cu_{0.33}Co_{0.67}O_xS_y$-NFs and $Cu_{0.67}Co_{0.33}O_xS_y$-NPs were examined by the field-emission scanning electron microscope attached with energy-dispersive X-ray (EDS) spectroscopy. The microstructure of the $Cu_{0.33}Co_{0.67}O_xS_y$-NFs and Cu0.67Co0.33OxSy-NPs was studied by the high-resolution transmission electron spectroscopy (HR-TEM, JEM 200CX, JEOL, 200 kV). This was attached with energy-dispersive X-ray spectroscopy (EDS). The elemental composition and oxidation states of the Cu0.33Co0.67OxSy-NFs and Cu0.67Co0.33OxSy-NPs were evaluated using X-ray photoelectron spectroscopy (XPS, Thermo Multi-Lab 2000 System) with Al Kα radiation.

In another embodiment of the present invention, the electrochemical characteristics of synthesized materials were tested using the BioLogic VMP3 electrochemical potentio-stat in a 3-electrodes configuration at normal temperature. Cyclic voltammetry (CV), galvanic charge-discharge (GCD), and electrochemical impedance spectroscopy (EIS) experiments were carried out in a 2 M KOH electrolyte. The Ag/AgCl, platinum wire, and the material grown on Ni foam were used as reference electrode, counter electrode, and working electrode, respectively. For negative electrode preparation, porous carbon material, conductive graphite, and PVdF binder with NMP solvent were mixed with a ratio of 8:1:1. The mixed slurry was coated on Ni foam. The coated Ni-foam samples were dried at 85° C. for 5 hours. In a 2-electrodes arrangement, a porous carbon material coated on Ni-foam worked as the negative electrode, while the synthesized material grown Ni-foam worked as the positive electrode with a piece of filter paper working as the separator in 2 M KOH electrolyte. The sandwich-type assembled asymmetric supercapacitors were effectively closed in a pouch-type bag for electrochemical testing with no leakage. For 3-electrodes configuration, specific capacity, and areal capacity were calculated from Equations 1 & 2. For the 2-electrodes arrangement, the areal capacitance, power density, and energy density of asymmetric supercapacitors were calculated using Equations 3 & 4.

$$Q = \frac{i \times \Delta t}{m} / \frac{i \times \Delta t}{a} \quad (1)$$

$$C = \frac{i \times \Delta t}{m \times \Delta V} \quad (2)$$

$$E = \frac{\int V(t)dt \times I}{3.6 * m} \quad (3)$$

$$P = \frac{E}{\Delta t} \times 3600 \quad (4)$$

where, specific/areal capacity (Ah/g or Ah/cm2), specific/areal capacitance (F/g or F/cm2), discharge current (A), active area of the electrode (cm2), potential window (V), discharge time (s), energy density (Wh/kg), and power density (W/kg) is denoted as Q, C, i, a, ΔV, Δt, E, and P, respectively.

FIG. 1 gives the schematic illustration for the preparation of $Cu_{0.33}Co_{0.67}O_xS_y$-NFs and $Cu_{0.67}Co_{0.33}O_xS_y$-NPs on Ni-foam. A simple wet-chemical method was used to grow Cu—Co oxysulfides on Ni— foam in a single step at a relatively lower temperature. Desired concentrations of Cu and Co along with disodium thiosulfate (S source) and urea were used to grow Cu—Co oxysulfides in-situ on Ni— foam. Initially the Cu2+ and Co2+ precipitate with $S_2O_3{}^{2-}$ ions to form [CuCo(OH)(S2O3)] complex, which further dissociates to give $Cu_{0.33}Co_{0.67}O_xS_y$-NFs and $Cu_{0.67}Co_{0.33}O_xS_y$-NPs based on the initial concentrations of Cu and Co precursors. The following equations were used to explain the formation mechanism of NFs and NFs theoretically.

$$xCU^{2+}{}_{1-x}CO^{2+}+S_2O_3{}^{2-}+2H_2O \rightarrow [Cu_xCo_{1-}(S_2O_3)(H_2O)_2] \quad (5)$$

$$xCU^{2+}{}_{1-x}CO^{2+}+S_2O_3{}^{2-} \rightarrow [Cu_xCo_{1-}(S_2O_3)_2]^{2-} \quad (6)$$

$$[Cu_xCo_{1-}(S_2O_3)(H_2O)_2] \rightarrow Cu_xCo_{1-x}S+SO^{-4}+2H^+ + H_2O \quad (7)$$

$$[Cu_xCo_{1-}(S_2O_3)_2]^{2-}+6H_2O \rightarrow CuxCo_{1-x}O_xS_y+3SO_2{}^{-4}+12H^+ \quad (8)$$

Figure 2A:
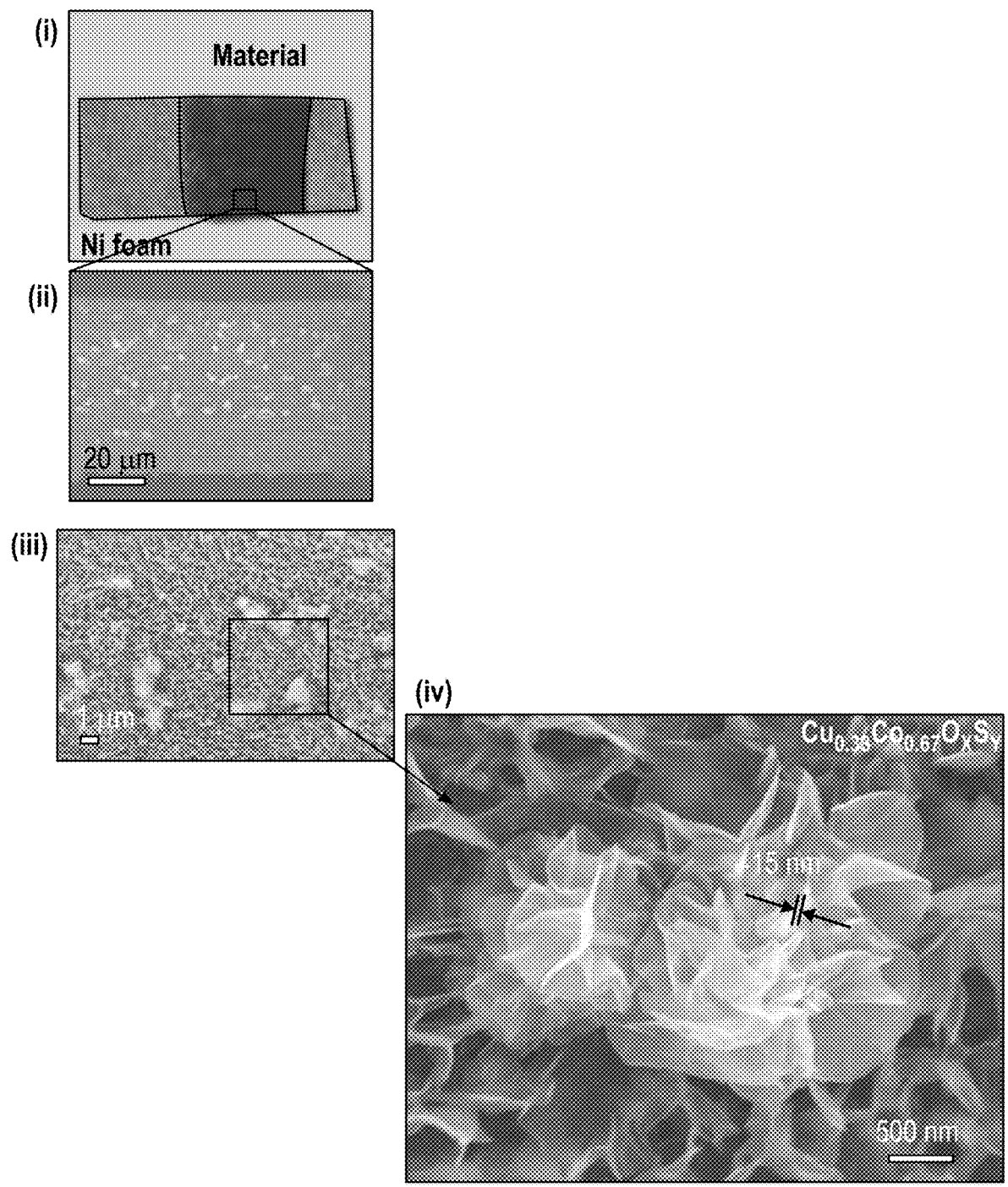
FIG. 2A depicts an optical image of $Cu_{0.33}Co_{0.67}O_xS_y$ grown Ni foam and FE-SEM images of $Cu_{0.33}Co_{0.67}O_xS_y$-NFs at different magnifications showing nanoflower-like morphology.
Figure 2B:
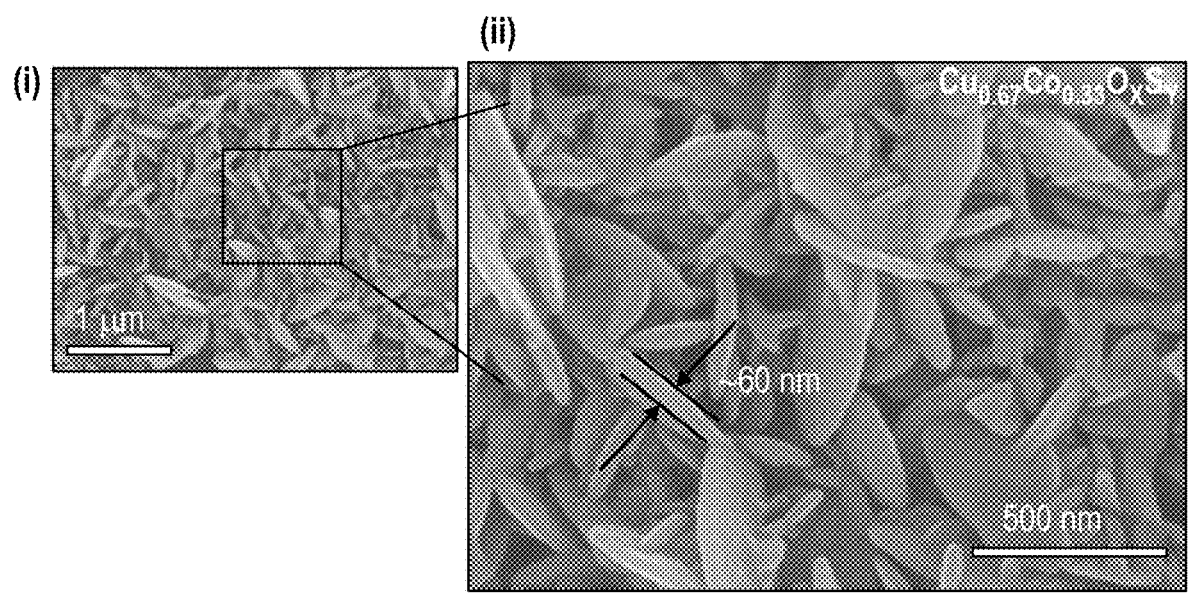
FIG. 2B shows FE-SEM images of $Cu_{0.67}Co_{0.33}O_xS_y$-NPs at different magnifications showing nanoplate-like morphology.
Figure 2C:
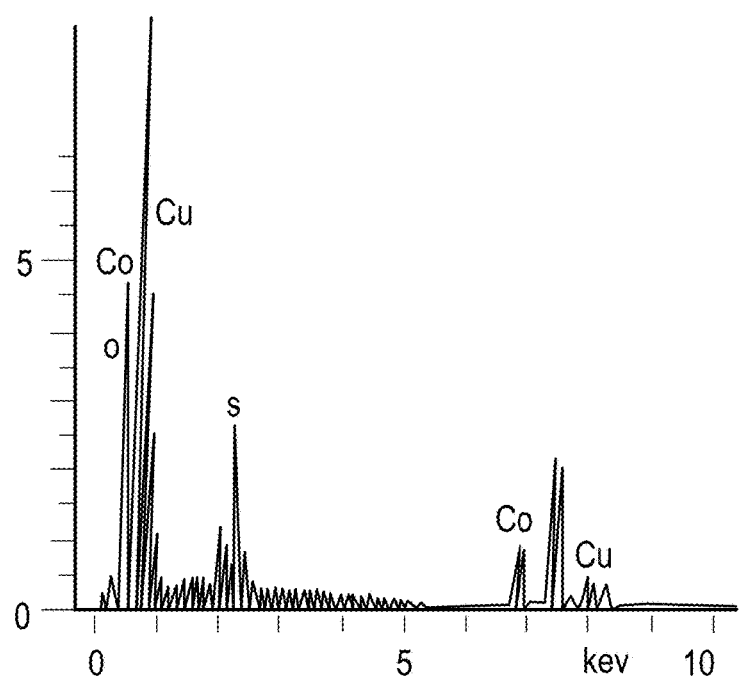
FIG. 2C shows an associated EDX spectrum.
Figure 2D:
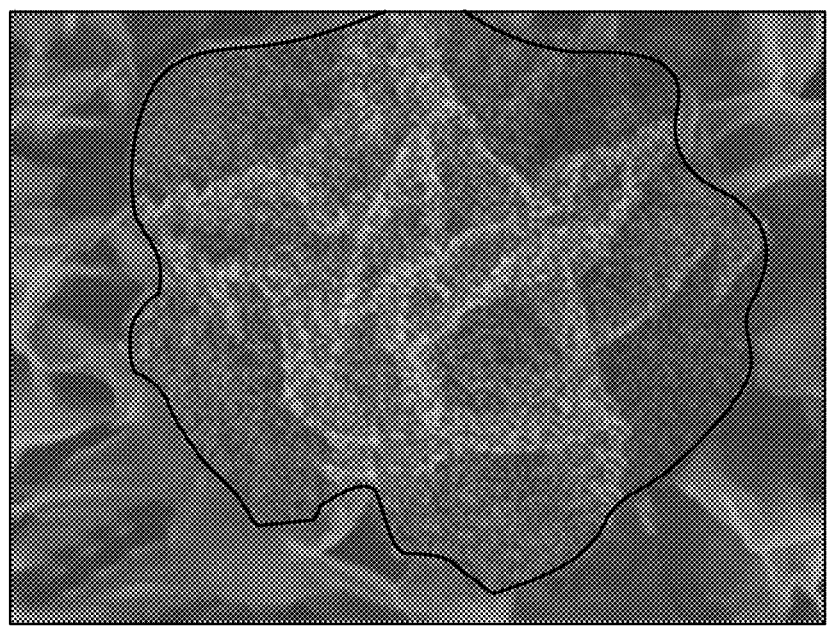
FIGS. 2D and 2E show elemental mapping images of $Cu_{0.33}Co_{0.67}O_xS_y$-NFs, respectively.
Figure 2E:
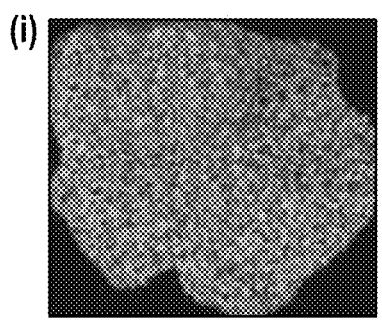
Figure 2E:
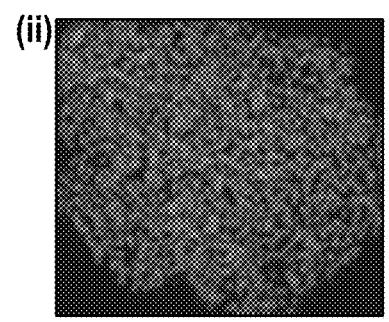
Figure 2E:
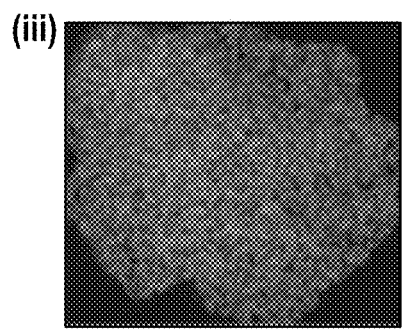
Figure 2E:
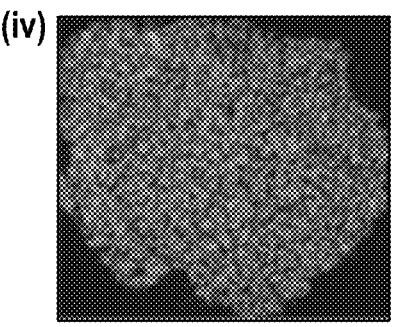
Figure 3A:
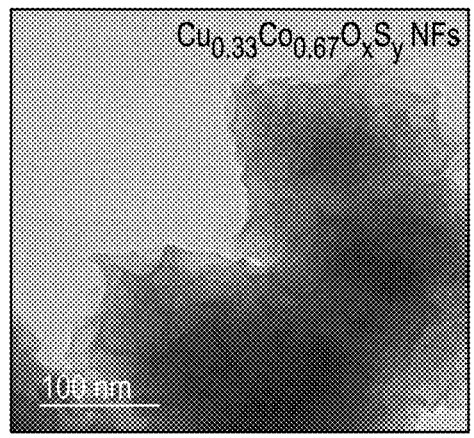
FIGS. 3A-3C show TEM images of $Cu_{0.33}Co_{0.67}O_xS_y$-NFs at various magnifications indicating the amorphous nature.
Figure 3B:
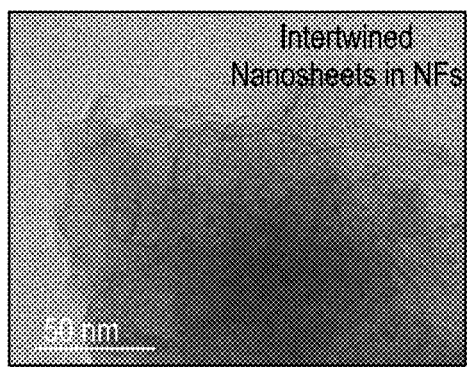
Figure 3C:
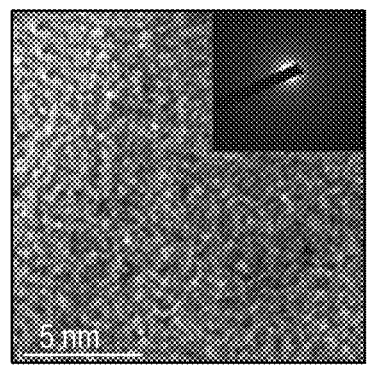

The suffixes x and y in the O and S species are represented the mole fractions of the chemical reactants. The direct growth of NFs and NPs morphology on Ni-foam is schematically shown in FIG. 1. In-situ grown NFs/NPs/Ni-foam provides improved conductive paths to improve the charge-transfer process for the duration of the electrochemical process. The generated NFs/NPs/Ni-foam morphology, which benefits from binder-free growth, has the potential to minimize dead surfaces and significantly increase the charge transfer. Furthermore, the constructed composite morphology might give many pathways for electrolyte penetration and boost the chemical activity, allowing redox reactions as well as energy storage capacity to be accelerated. The morphology of the as prepared Cu—Co oxysulfides was investigated using a field-emission scanning electron microscope (FE-SEM). The oxysulfides that grew on Ni-foam were easily identified from the black precipitate deposited on Ni-foam as shown in FIG. 2A(i). The FE-SEM images given in FIG. 2A(ii-iv) show nanoflower-like morphology for $Cu_{0.33}Co_{0.67}O_xS_y$, while the $Cu_{0.33}Co_{0.67}O_xS_y$ sample shows nanoplate-like morphology as observed in FIG. 2B(i-ii). The nanoflower-like morphology of $Cu_{0.33}Co_{0.67}O_xS_y$ has been obtained from the aggregation of ultrathin (15 nm) layers of oxysulfides (FIG. 2A (iv)). The nanoplates of the $Cu_{0.33}Co_{0.67}O_xS_y$ sample have a thickness of 60 nm (FIG. 2B (ii)). The energy dispersive X-ray (EDX) analysis of $Cu_{0.33}Co_{0.67}O_xS_y$-NFs shows uniform distribution of Cu, Co, O, and S across the selected area as shown in FIG. 2C (spectrum), and FIGS. 2D and 2E(i-iv) (elemental mapping). The change in morphology of two samples from nanoflower to nanoplate, reveals the effect of precursor Cu and Co concentrations on the morphology of the resulting oxysulfides. Further TEM analysis was carried out on $Cu_{0.33}Co_{0.67}O_xS_y$-NFs samples, which also show nanoflower-like morphology as given in FIGS. 3A and 3B. The selected area electron diffraction (SAED) pattern of $Cu_{0.33}Co_{0.67}O_xS_y$-NFs has no bright spots suggesting the amorphous nature of the material (FIG. 3C). Furthermore, the amorphous nature of the prepared material was further analyzed through the XRD analysis.

Figure 3D:
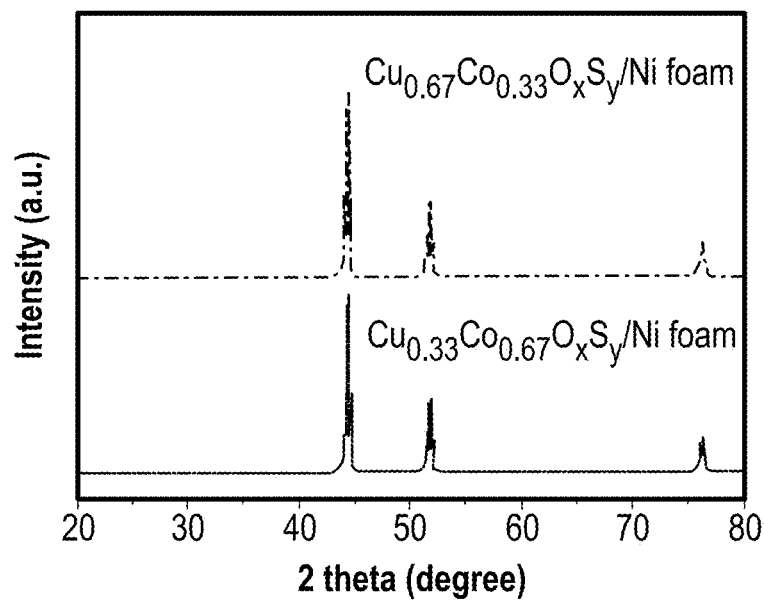
FIG. 3D depicts associated XRD patterns.
Figure 3E:
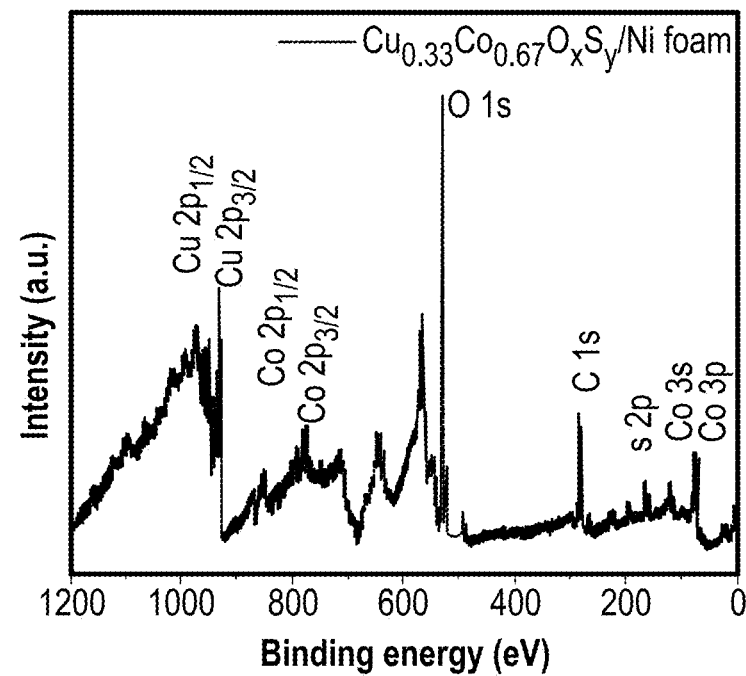
FIG. 3E shows XPS survey spectra; and high-resolution spectra of FIG. 3F—Cu 2p, FIG. 3G—Co 2p, FIG. 3H—O 1 s, and FIG. 3I—S 2p of $Cu_{0.33}Co_{0.67}O_xS_y$-NFs.
Figure 3F:
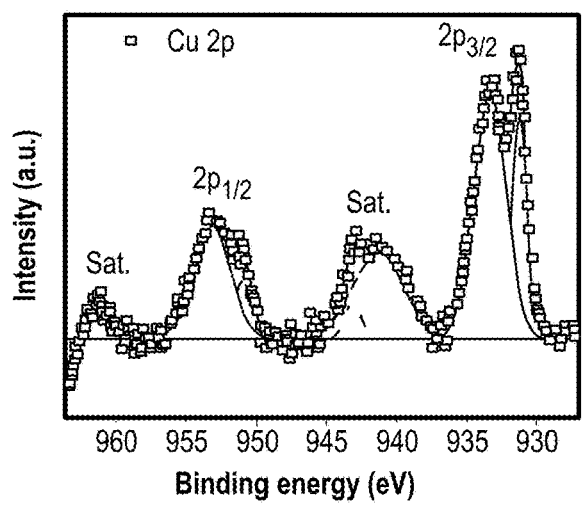
Figure 3G:
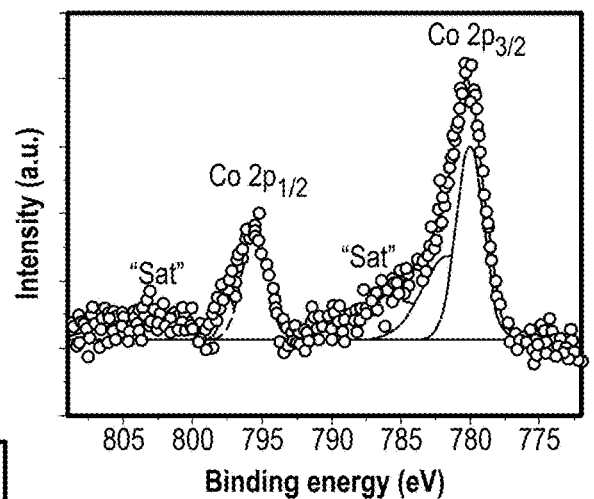
Figure 3H:
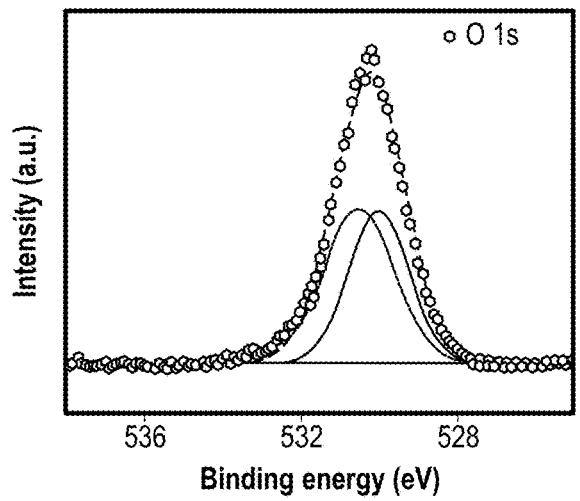
Figure 3I:
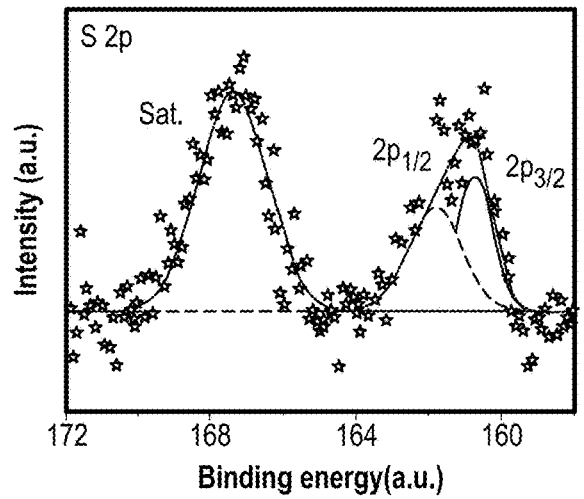

The XRD patterns of both oxysulfide samples show the peaks related to Ni-foam, this may be due to the higher intensity of Ni-foam along with the amorphous nature of both samples (FIG. 3D). To study the structural composition, X-ray photoelectron spectroscopy (XPS) measurements were carried out for the oxysulphides. The XPS survey spectra of $Cu_{0.33}Co_{0.67}O_xS_y$-NFs show the binding energy peaks corresponding to Cu, Co, O, and S (FIG. 3E). The convoluted high-resolution spectrum of Cu 2p show two binding energy peaks at 931, 933.4, and 950.8, 953.2 eV corresponding to Cu 2p3/2 and Cu 2p1/2 with related shakeup satellite peaks, indicating the presence of Cu+, Cu—O—S, and Cu2+. Likewise, FIG. 3G shows the high-resolution spectrum of Co 2p, it also shows the binding energy peaks at 780, 781.6, and 795.5 797.3 eV corresponding to Co 2p3/2 and Co 2p1/2, suggesting the presence of Co2+, Co—O—S, and Co3+. In the case of high-resolution spectra of O 1 s (FIG. 3H), the binding energies located at 529.9, and 530.7 eV are attributed to the metal-oxygen and defect sites of S—O-metal. As given in FIG. 3I, the high-resolution spectra of S 2p show two binding energy peaks at 160.7 and 161.9 eV for S 2p3/2 and S 2p1/2, indicating the presence of S in S2-oxidation state in the as-prepared sample and are ascribed to the metal-sulfur bonds. For an instant, the binding energy peak at 167.5 eV is attributed to the S—O bond, which is due to the oxidation effect. There are no peaks corresponding to Co—S and Cu—S bonds in the Co 2p and Cu 2p spectra, indicating that no cobalt sulfide and/or copper sulfide secondary phases exist in the synthesized sample.

Figure 4A:
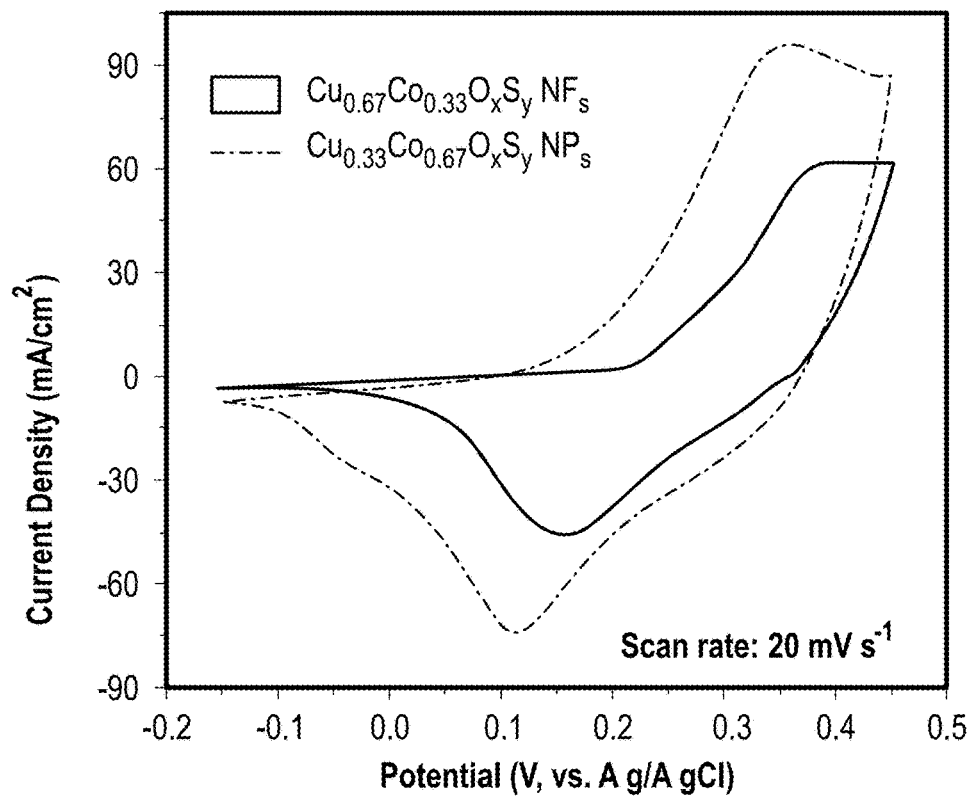
FIGS. 4A-4N depict electrochemical properties of $Cu_{0.33}Co_{0.67}O_xS_y$-NFs and $Cu_{0.67}Co_{0.33}O_xS_y$-NPs measured in 1 m KOH electrolyte with a three-electrode system.
Figure 4B:
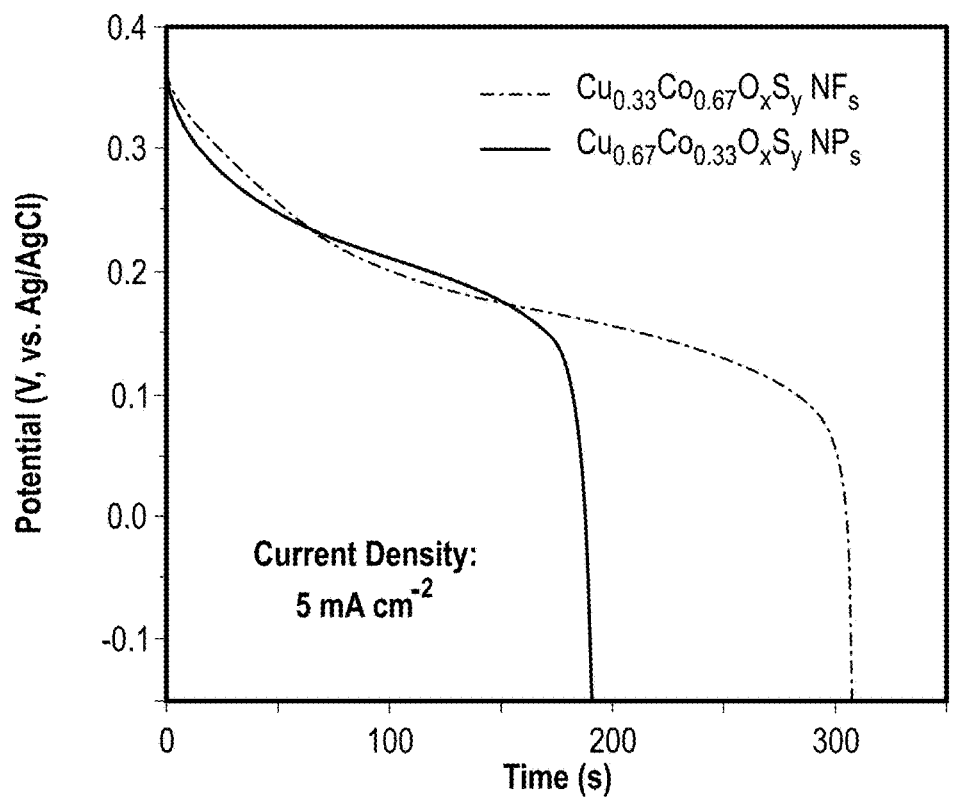

The overall XPS study reveals multiple oxidation states for Cu and Co, suggesting higher electrochemical redox behavior for the as prepared oxysulfides in HSCs. The electrochemical performance of $Cu_{0.33}Co_{0.67}O_xS_y$-NFs and $Cu_{0.33}Co_{0.67}O_xS_y$-NPs was examined using a three-electrode cell in a 2 M KOH solution. The $Cu_{0.33}Co_{0.67}O_xS_y$-NFs and $Cu_{0.33}Co_{0.67}O_xS_y$-NPs in situ grown samples were used as working electrodes and electrochemical performance was compared to identify the suitable sample for further electrochemical testing. FIG. 4A shows the CV curves of $Cu_{0.33}Co_{0.67}O_xS_y$-NFs and $Cu_{0.33}Co_{0.67}O_xS_y$-NPs measured in the potential window of 0.15-0.45 V at a scan rate of 20 mV s$^{-1}$. Both oxysulfides show clear redox peaks in their CV curve, which is distinct compared to the CV curves of carbon-based materials. This redox behavior indicates the battery-type nature of $Cu_{0.33}Co_{0.67}O_xS_y$-NFs and $Cu_{0.33}Co_{0.67}O_xS_y$-NPs samples and further provides higher charge storage performance compared to pseudocapacitive materials. The redox peaks in the CV curves are due to the interaction of oxysulfide and the ions in the electrolyte solution. The plausible redox reaction that takes place at the electrode-electrolyte interface is given the Equation 1.

$$Cu_{0.33}Co_{0.67}O_xS_y+4OH^- \leftrightarrow Cu_{0.33}O_xS_y(OH^-)_2 + Co_{0.67}O_xS_y(OH^-)_2+4e^- \quad (9)$$

Figure 4C:
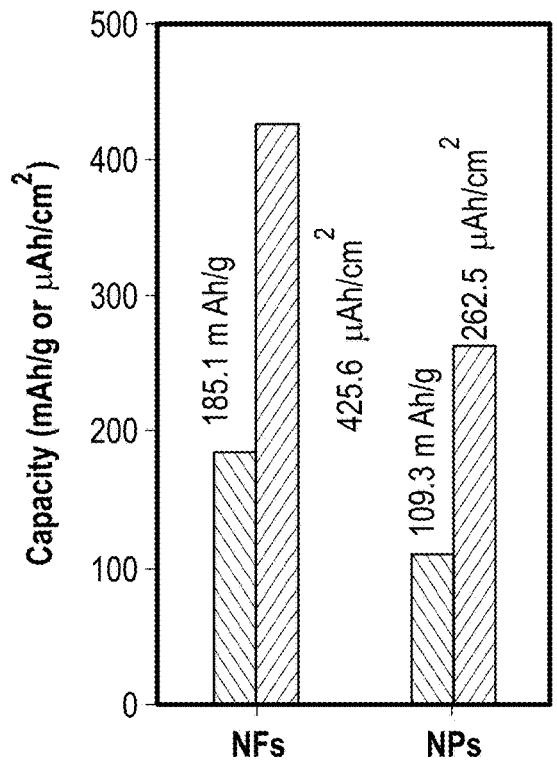

As seen in the comparative CV curves, $Cu_{0.33}Co_{0.67}O_xS_y$-NFs show a larger area under the CV curve and have higher redox peak current values compared to $Cu_{0.33}Co_{0.67}O_xS_y$-NPs (FIG. 4A). Furthermore, galvanostatic charge-discharge (GCD) studies were performed on these samples to determine their charge storage performance. The GCD curves of both samples were given in FIG. 4B, which shows a higher discharge time for $Cu_{0.33}Co_{0.67}O_xS_y$-NFs signifying high electrochemical charge storage performance. As the growth of oxysulfides on Ni-foam takes place in-situ during the wet synthesis process, the mass loading on Ni-foam varies with concentrations of Cu and Co precursors. As a result of dissimilar mass loading, the gravimetric capacity at a constant discharge current could be greatly affected. In this regard, the comparison of capacities of these oxysulfides can be done according to the active area of the material on Ni-foam. FIG. 4C shows the calculated gravimetric and areal capacity values of both oxysulfides. The $Cu_{0.33}Co_{0.67}O_xS_y$-NFs show gravimetric and areal capacity values of 185.1 mAh/g and 425.6 µAh/cm$^2$, respectively.

While the $Cu_{0.33}Co_{0.67}O_xS_y$-NPs show gravimetric and areal capacity values of 109.3 mAh/g and 262.5 µAh/cm², respectively.

The higher discharge capacity of $Cu_{0.33}Co_{0.67}O_xS_y$-NFs can be attributed to its flower-like morphology, as it provides a larger active catalytic surface area for the electrochemical redox reactions that takes place at the electrode-electrolyte interface. The three-dimension structure materials have drawn a lot of attention in their research and design because they offer enough space and active sites for the interactions of electrolyte ions during the electrochemical process. These processes of electron intercalation and deintercalation might be improved by the well-ordered 3D flower-like morphology with a high electroactive area. The 3D structure may lead to better electrochemical performances. Every sheet can take part in the electrochemical reaction because every sheet is in contact with the electrolyte, which confirms the free space between the adjacent sheets that make it possible for the easy diffusion of electrolyte. The electrode/electrolyte contact area could be increased by the 3D structure made of centrifugally self-assembled nanosheets, which could also facilitate the fast transport of electrons and ions. A 3D flower-like morphology can facilitate the high specific capacitance and good cycling performance, which are caused by the high specific surface area and self-assembled sheet structures that are advantageous for enhancing electrical conductivity and high structural stability throughout the charge-discharge process. In addition, the electronic conductivity of these materials was investigated by performing electrochemical impedance spectroscopy (EIS) measurements.

Figure 4D:
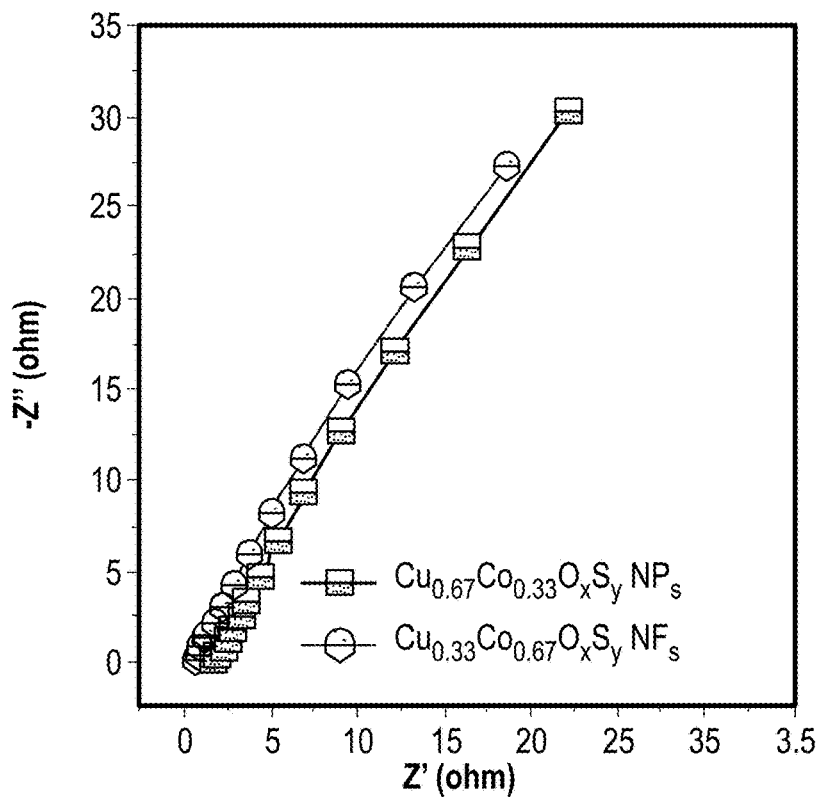
FIG. 4D shows EIS Nyquist plots.
Figure 4E:
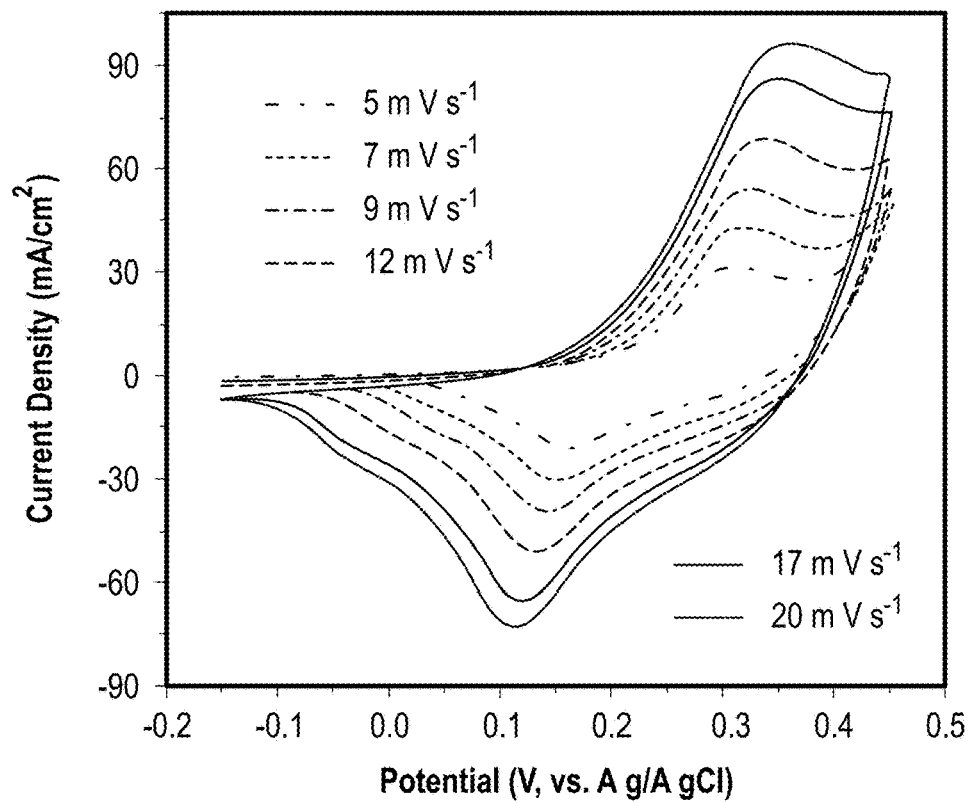
FIGS. 4E-4G shows CV curves, GCD curves, and calculated areal/gravimetric capacities as a function of current density.

The $Cu_{0.33}Co_{0.67}O_xS_y$-NFs sample shows the lower series and charge transfer resistances of ($R_s$ and $R_{ct}$) 0.37Ω and 0.74Ω and the $Cu_{0.33}Co_{0.67}O_xS_y$-NFs sample shows the $R_s$ and $R_{ct}$ values of 1.61Ω and 1.1Ω. The Nyquist plots given in FIG. 4D show a smaller charge resistance for the $Cu_{0.33}Co_{0.67}O_xS_y$-NFs sample, indicating higher conductivity and thereby higher charge storage performance than the NP electrode. The low-frequency region in the EIS spectra of both samples shows a linear spike, which indicates a higher ion diffusion for both oxysulfides. Furthermore, the electrochemical performance of $Cu_{0.33}Co_{0.67}O_xS_y$-NFs in detail was analyzed by measuring CV and GCD at various scan rates and current density values. FIG. 4E depicts the CV curves of the $Cu_{0.33}Co_{0.67}O_xS_y$-NFs sample at different scan rates, which shows a clear redox peak suggesting battery-type redox mechanisms as well as better electrochemical reversibility. In addition, the redox peak current value increases with the increase of scan rate (5-20 mV s$^{-1}$), implying admirable electrochemical kinetics of $Cu_{0.33}Co_{0.67}O_xS_y$-NFs.

Figure 4F:
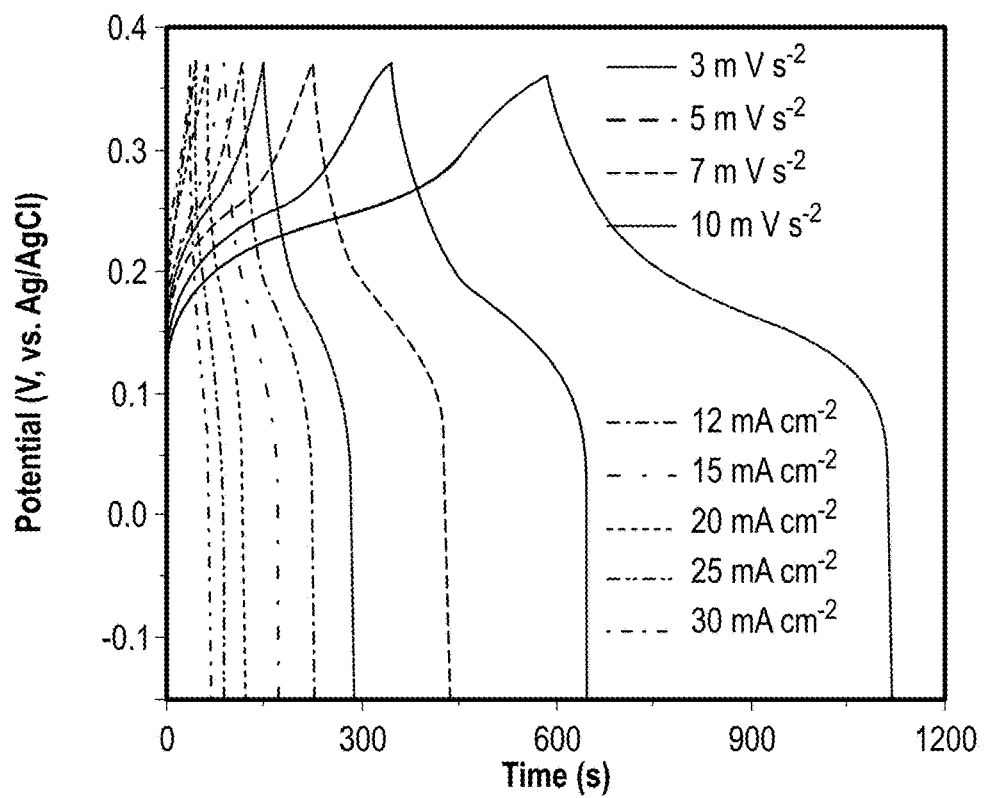
Figure 4G:
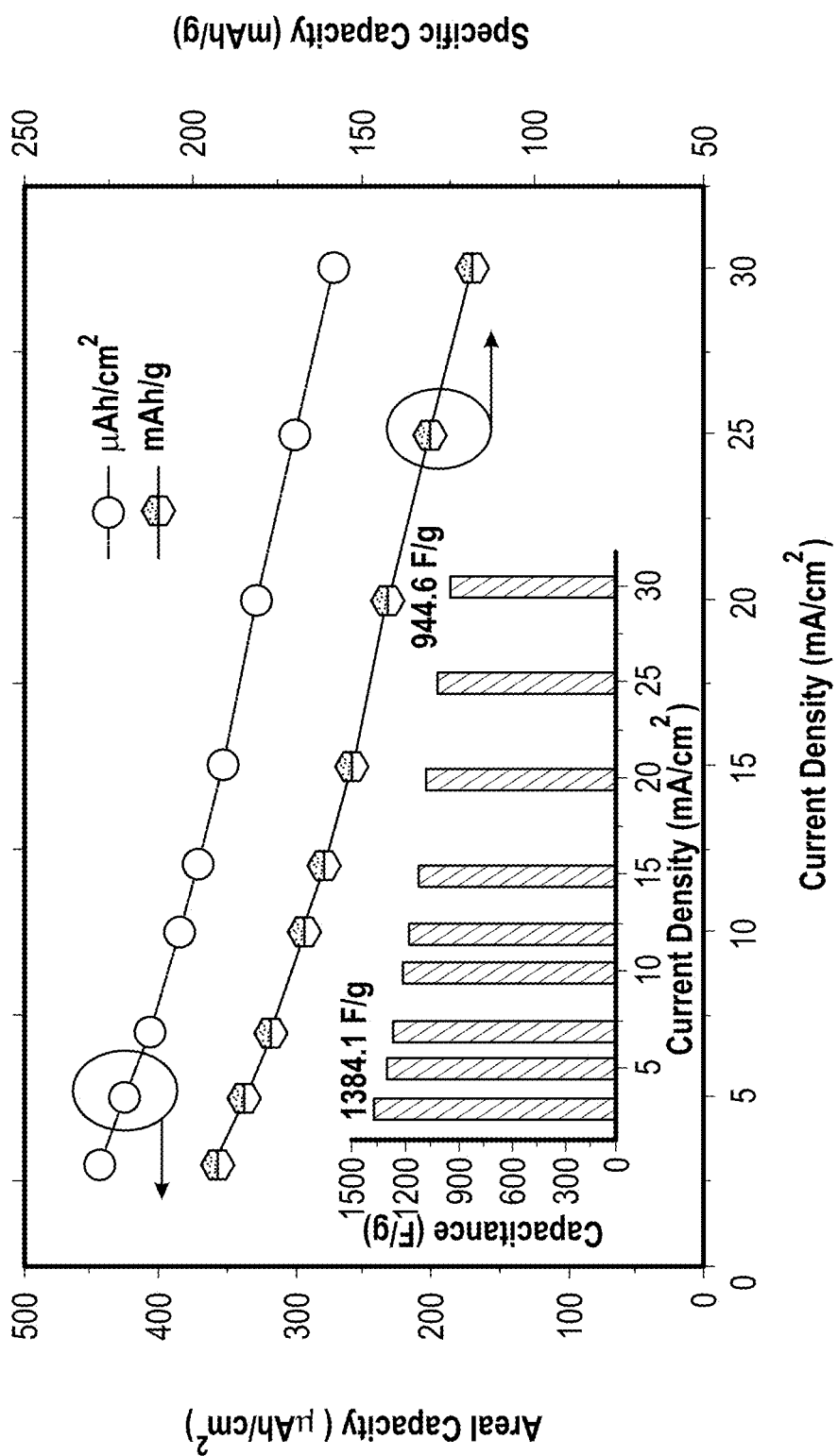
Figure 4H:
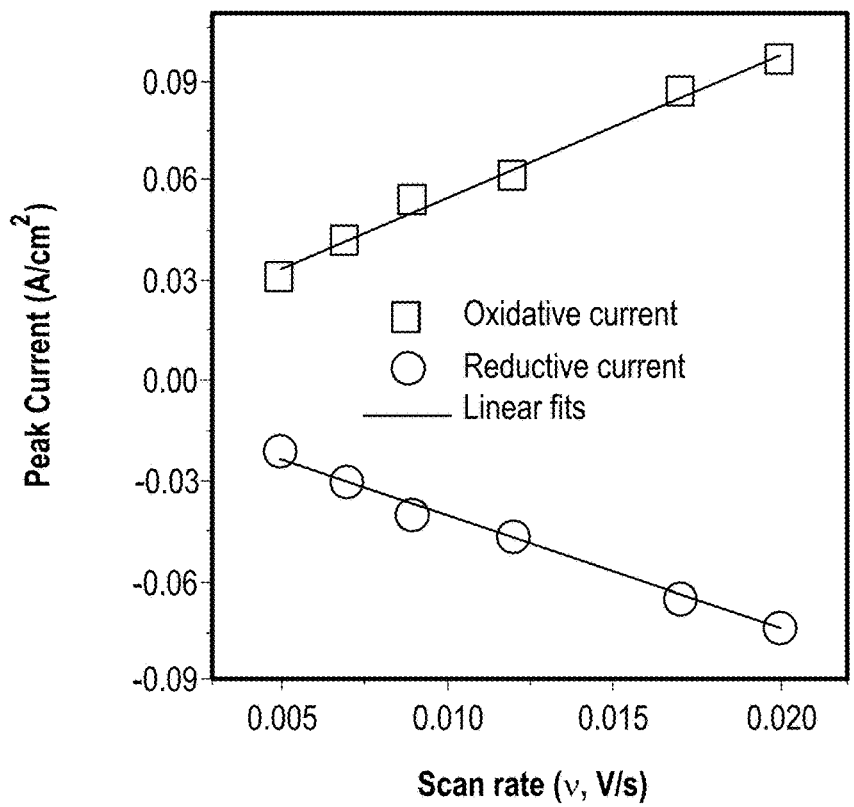
FIG. 4H shows linear relationship of peak current versus scan rate.
Figure 4I:
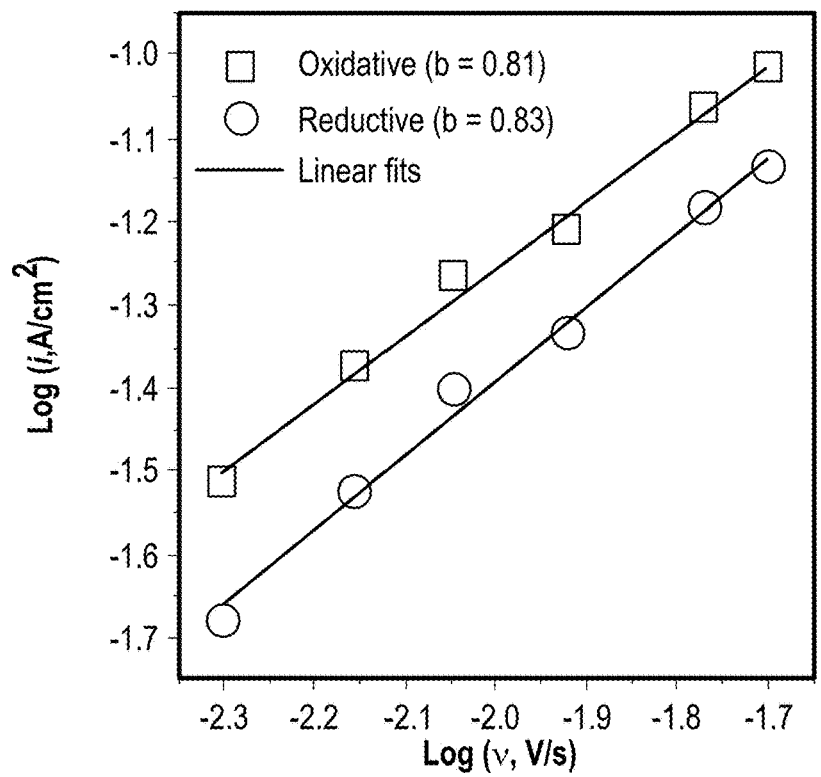
FIG. 4I depicts values obtained after linear fitting of oxidation and reduction peak currents with respect to scan rates.
Figure 4J:
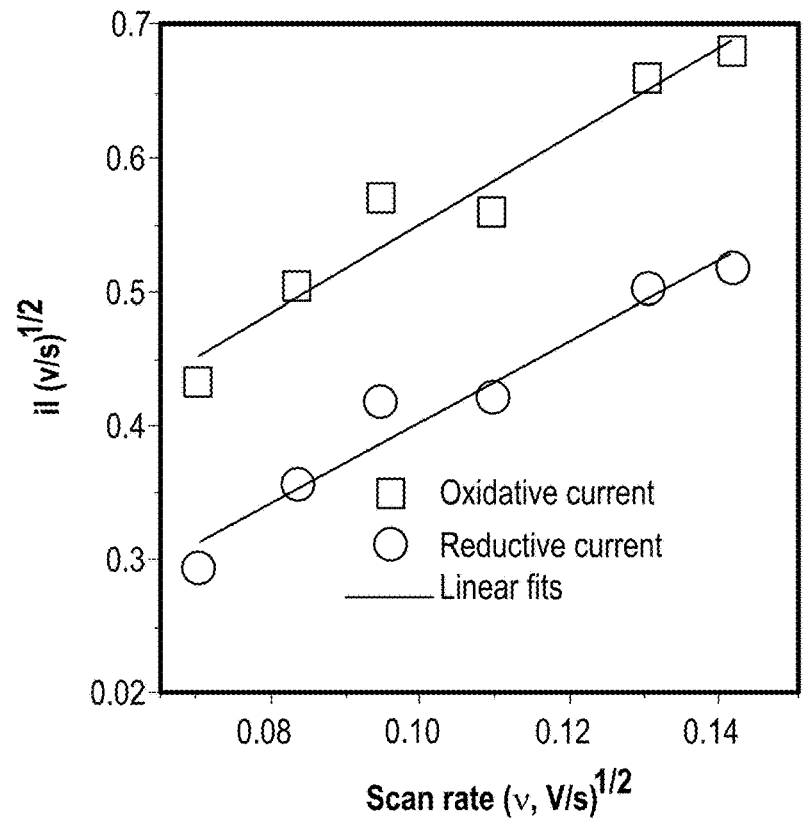
FIG. 4J shows linear fit of $i/v^{1/2}$ and $v^{1/2}$ for the k1 and k2 constants and FIG. 4K depicts percentage contribution of capacitive and battery-type behavior.

To determine the electrochemical charge storage performance of $Cu_{0.33}Co_{0.67}O_xS_y$-NFs, GCD analysis was carried out at various current density values ranging from 3 to 30 mA cm$^{-2}$. FIG. 4F shows the GCD curves of $Cu_{0.33}Co_{0.67}O_xS_y$-NFs, which reveal excellent charge storage performance. With a lower charge storage resistance value as obtained from EIS and a larger surface area of NFs (FE-SEM), the $Cu_{0.33}Co_{0.67}O_xS_y$ sample delivers areal and gravimetric capacity values of 444, 426, 407, 385, 372, 353, 329, 301, and 272 µAh/cm² and 193, 185, 177, 167, 162, 154, 143, 131, 118 mAh/g for different current density values of 3-30 mA cm$^{-2}$ (FIG. 4G). The inset of FIG. 4G gives the specific capacitance vs current density for the $Cu_{0.33}Co_{0.67}O_xS_y$-NFs sample. It shows an excellent specific capacitance of 1384.1 Fg$^{-1}$ at 3 mA cm$^{-2}$ and it shows a capacitance value of 944.6 Fg$^{-1}$ at 30 mA cm 2. FIG. 4H presents the linear fits to the oxidative and reduction peaks vs. square root of the scan rate of both $Cu_{0.33}Co_{0.67}O_xS_y$-NFs, $Cu_{0.33}Co_{0.67}O_xS_y$-Nps at various scan rates.

With the increasing scan rate, the peak currents were increased linearly. To validate these linear fits, the power law and the modified power-law are used. From FIG. 4I, the b values of the samples were estimated by the CV curve redox peaks using the power-law i=a vb, where i is the peak current (A), a, b are variable parameters, and v is applied scan rate (V/s). Generally, the b value is in the range of 0.5-1. The exhibited b values of 0.81 and 0.83 for oxidative and reduction peaks of both the samples indicate the major surface-controlled charge storage mechanism and dominant diffusion-controlled mechanism. The linear curves between log(i) and log(v) were plotted to determine the kind of charge-storage mechanism for the synthesized material. To investigate the quantitative quantity of charge collection by the capacitive type or battery type diffusion-controlled for the prepared materials, the power-law was further modified.

$$i=k_1v+k_2v^{1/2} \tag{10}$$

Figure 4K:
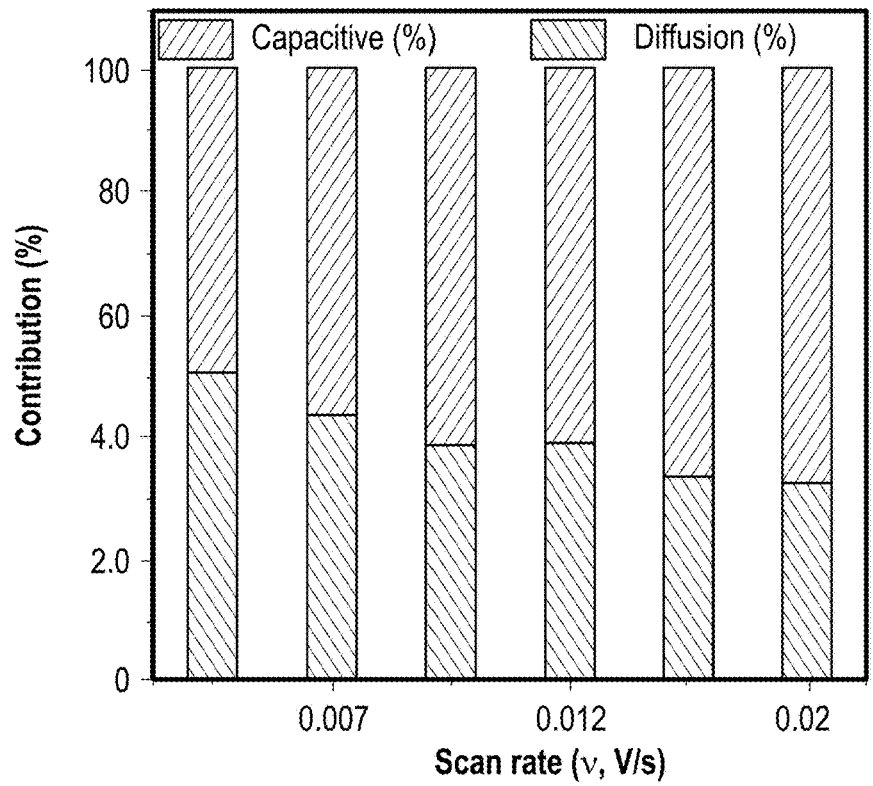
Figure 4L:
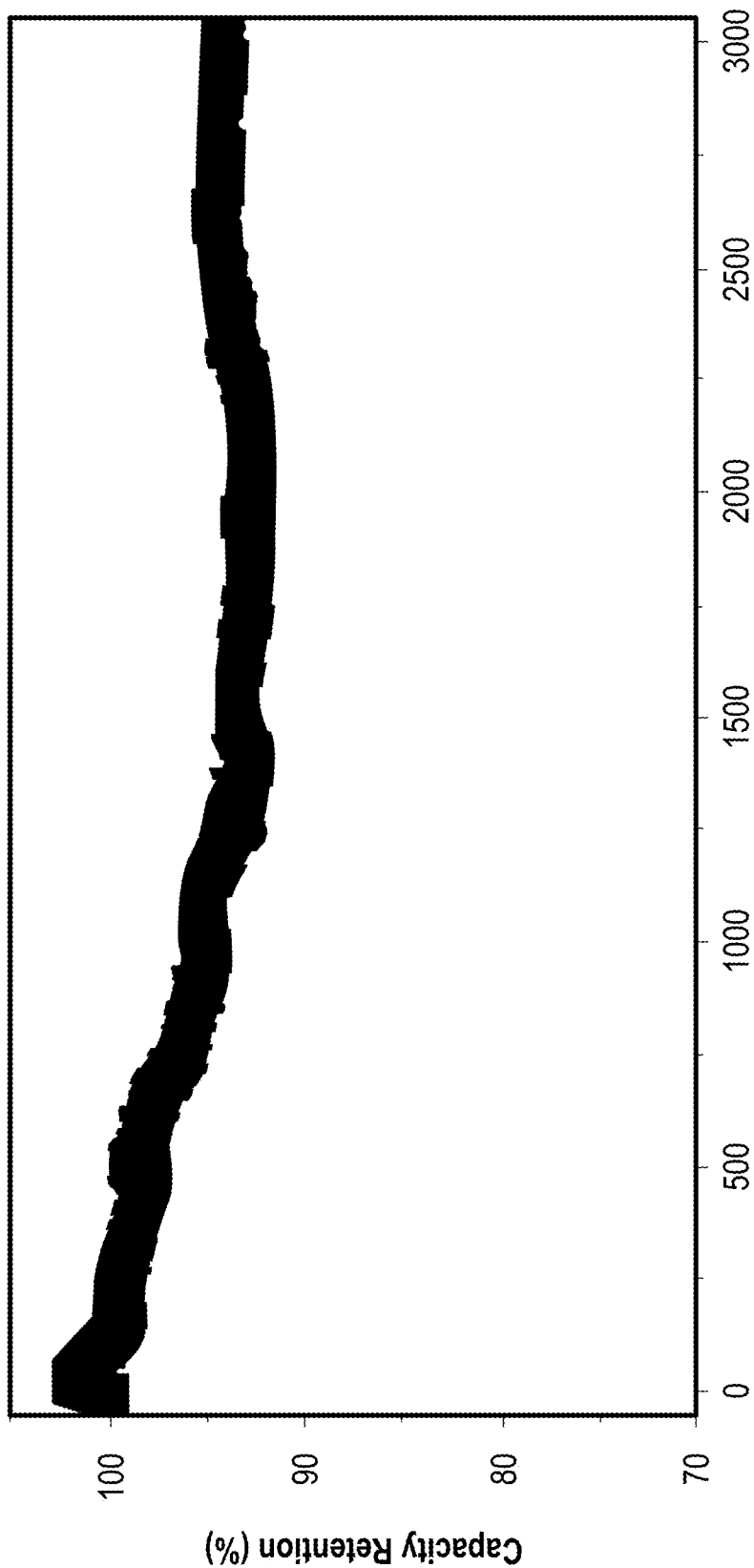
FIG. 4L depicts stability test of the $Cu_{0.33}Co_{0.67}O_xS_y$-NFs electrode for 3000 cycles
Figure 4M:
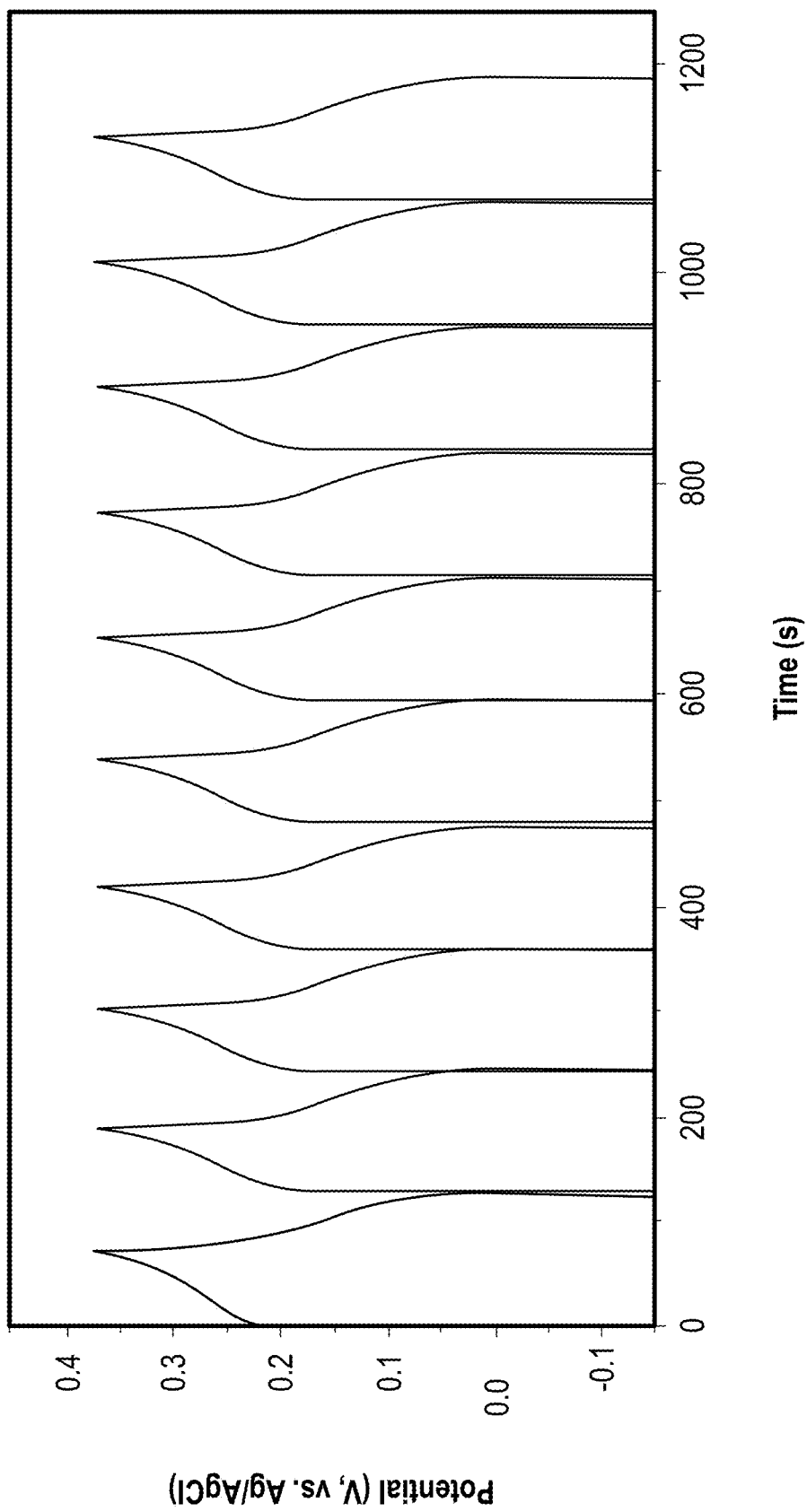
FIG. 4M shows that of corresponding GCD curves.
Figure 4N:
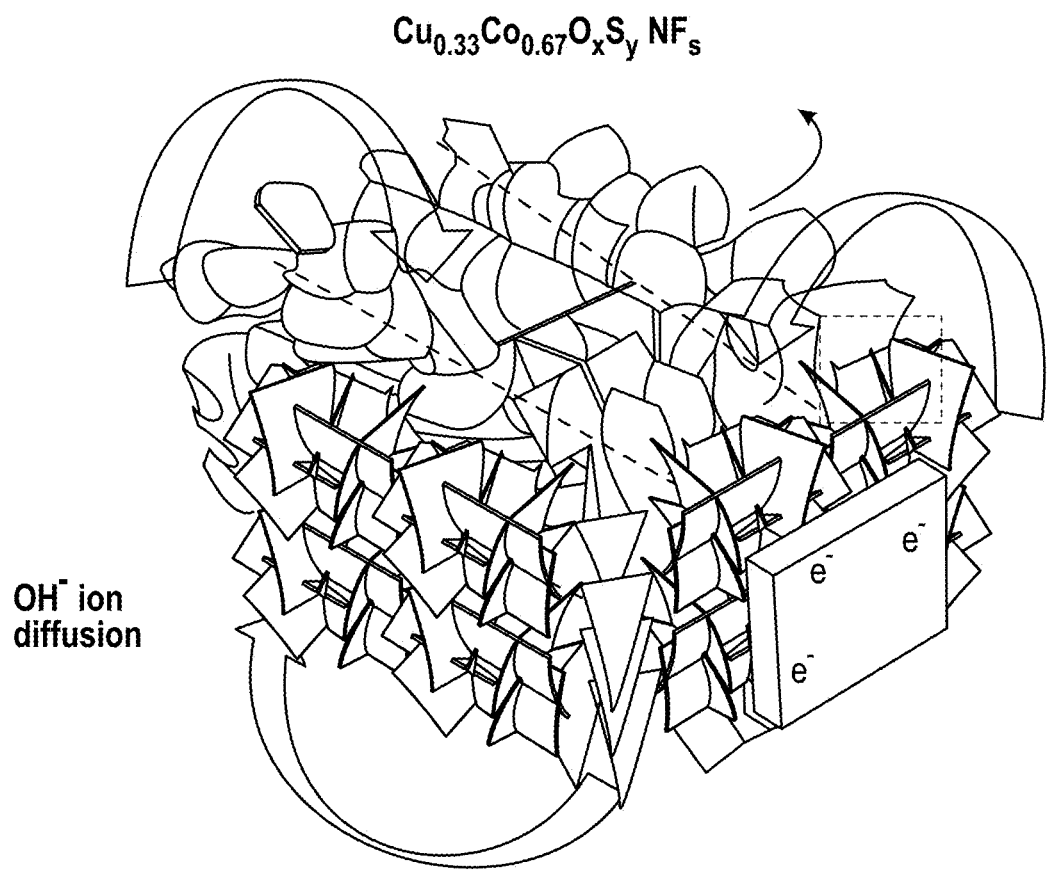

And it can be changed into:

$$i/v^{1/2}=k_1v^{1/2}+k_2 \tag{11}$$

where "i" is the peak current in A, Iv" is the scan rate in V/s, and k1 and k2 are denoted as the variable parameters. From FIG. 4J, the linear fit of the CV curves vs. scan rate, the slope and intercept values of k1 and k2 are considered. FIG. 4K presents the calculated bar chart values of 50.7%, 43.6%, 38.6%, 39.2%, 33.3%, 32.3% and 49.3%, 56.4%, 61.4%, 60.8%, 66.7%, 67.7% capacitive and diffusion-controlled charge storage contribution of $Cu_{0.33}Co_{0.67}O_xS_y$-NFs and $Cu_{0.33}Co_{0.67}O_xS_y$-Nps at different scan rates. These values indicate the major capacitive-type contribution to the charge storage mechanism. The remarkable performance of the $Cu_{0.33}Co_{0.67}O_xS_y$-NFs sample can be attributed to its low charge transfer resistance value and diffusion-controlled battery-type nature (FIG. 4K). Furthermore, the stability of $Cu_{0.33}Co_{0.67}O_xS_y$-NFs electrodes was tested by performing 3000 GCD cycles (FIG. 4L). It showed capacity retention of 95% even after 3000 cycles, indicating greater stability of $Cu_{0.33}Co_{0.67}O_xS_y$-NFs. FIG. 4M shows GCD curves of $Cu_{0.33}Co_{0.67}O_xS_y$-NFs cycled at 20 mA cm$^{-2}$, which reveals that both the charge and discharge process is highly reversible throughout the cycling process. FIG. 4N illustrates the ion and electron transport mechanism of $Cu_{0.33}Co_{0.67}O_xS_y$-NFs electrode during the electrochemical charge storage process. The ultrathin nanoflowers of $Cu_{0.33}Co_{0.67}O_xS_y$-NFs decorated on Ni-foam provide an adequate path for the electrons and the electrolyte to move across the electrode material. This results in the effective utilization of electrode material and thereby improves the overall charge storage performance and cyclic stability. From the above electrochemical analysis, it is observed that the self-assembled flower-like structure provides a large surface area, offer more active sites for intercalation of electrolyte, and increase its utilization as a working material. All these suggest that flower-like morphology may be more beneficial to enhancing the overall electrochemical properties as compared to other morphologies like nanoparticles, nanoplates, and nanospheres. To demonstrate the practical application, as illustrated in the schematic diagram of FIG. 5A, HSCs were fabricated using $Cu_{0.33}Co_{0.67}O_xS_y$-NFs decorated on Ni-foam and porous carbon as positive and negative electrodes, respectively using 2 M KOH electrolyte solution. The electrodes were electronically separated using cellulose filter paper and the pouch-type cell was fabricated using the above arrangements. Before the fabrication of HSCs, to achieve maximum energy storage the charge on both electrodes should be balanced. Correspondingly, the following mass-balancing equation is used to calculate the mass ratio between the positive and negative electrode material.

$$\frac{m^+}{m^-} = \frac{C^- \times \Delta V^-}{Q_{ac}^+} \quad (12)$$

where m+=positive electrode mass, $Q_{ac}$=capacity of positive material, m−=negative electrode mass, C−=capacity of negative material, and ΔV−=potential window of the negative electrode.

Figure 5A:
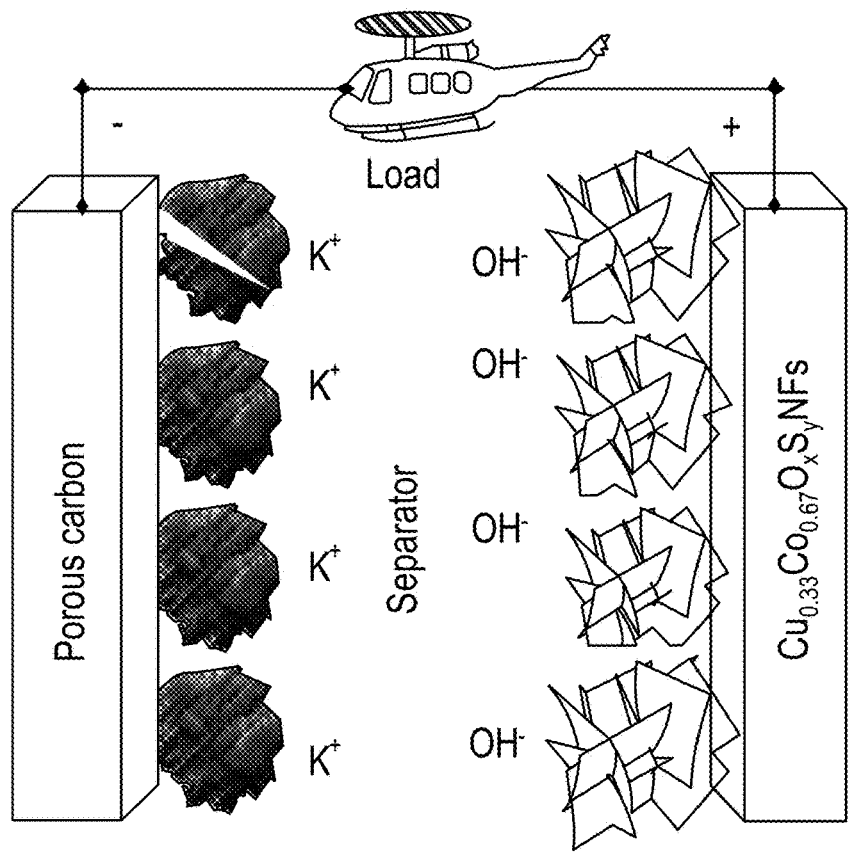
FIG. 5A is a schematic diagram showing the fabrication process of pouch-type HSC using alkaline electrolyte-based $Cu_{0.33}Co_{0.67}O_xS_y$-NFs and porous carbon electrodes with a separator.
Figure 5B:
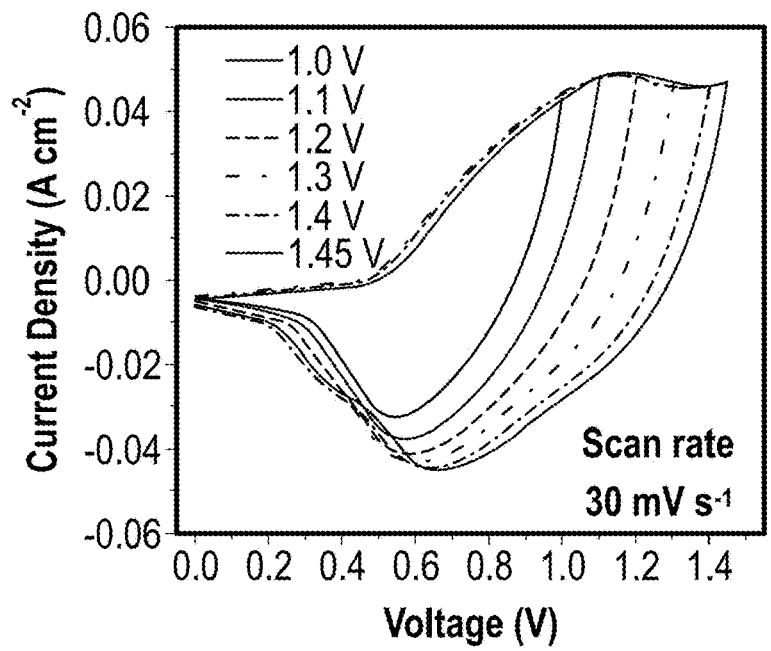
FIG. 5B shows CV and FIG. 5C shows GCD curves of the fabricated HSC tested at various voltage windows with a fixed scan rate (30 mV $s^{-1}$) and current density (25 mA cm 2).
Figure 5C:
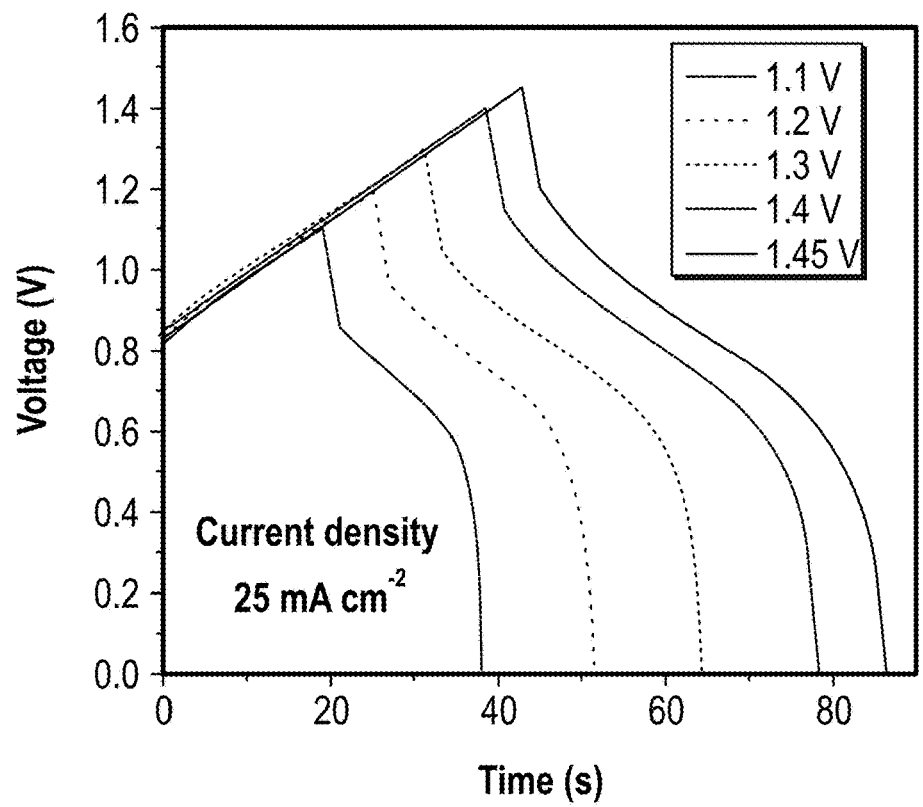
Figure 5D:
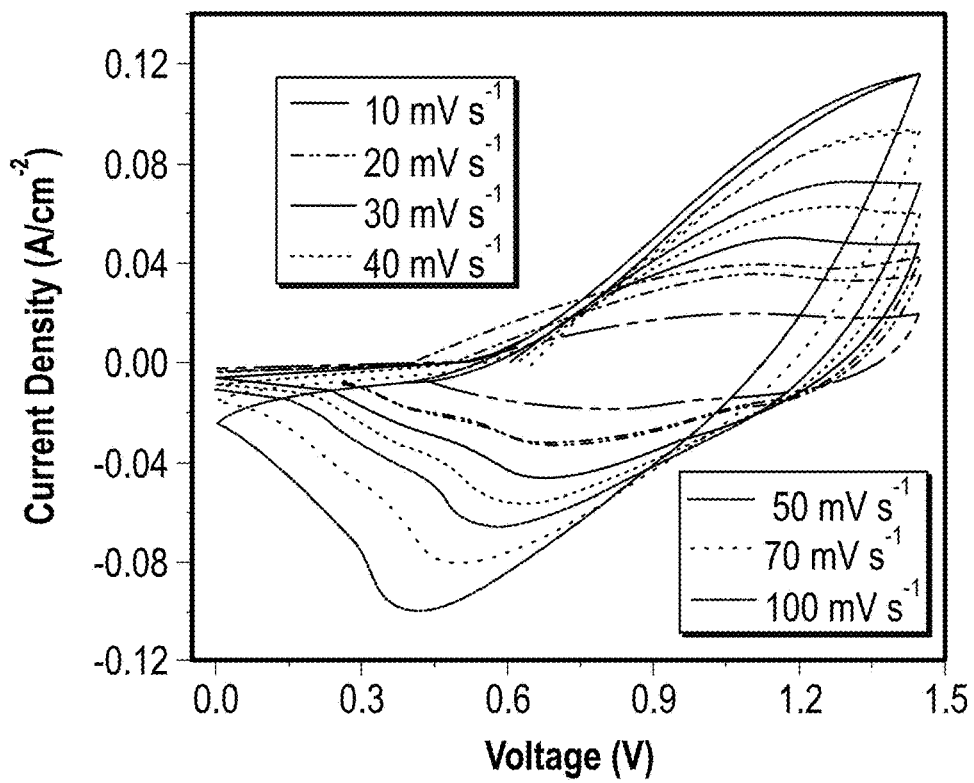
FIG. 5D shows CV and FIG. 5E shows GCD curves of HSC measured at various scan rates and current densities between a voltage window of 0-1.45 V.
Figure 5E:
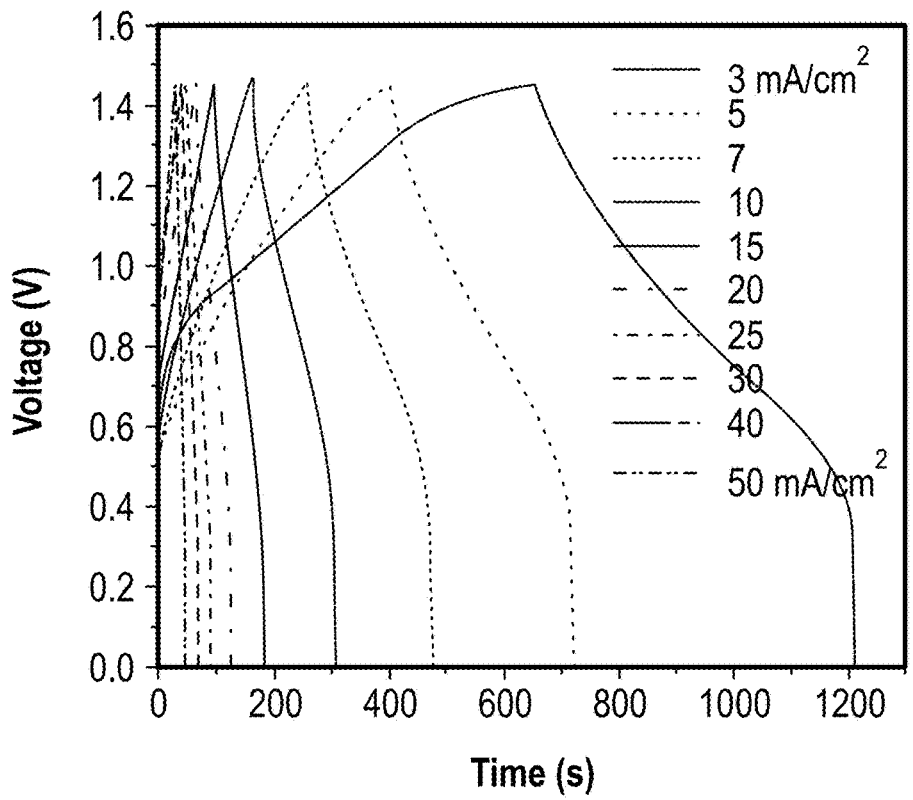
Figure 5F:
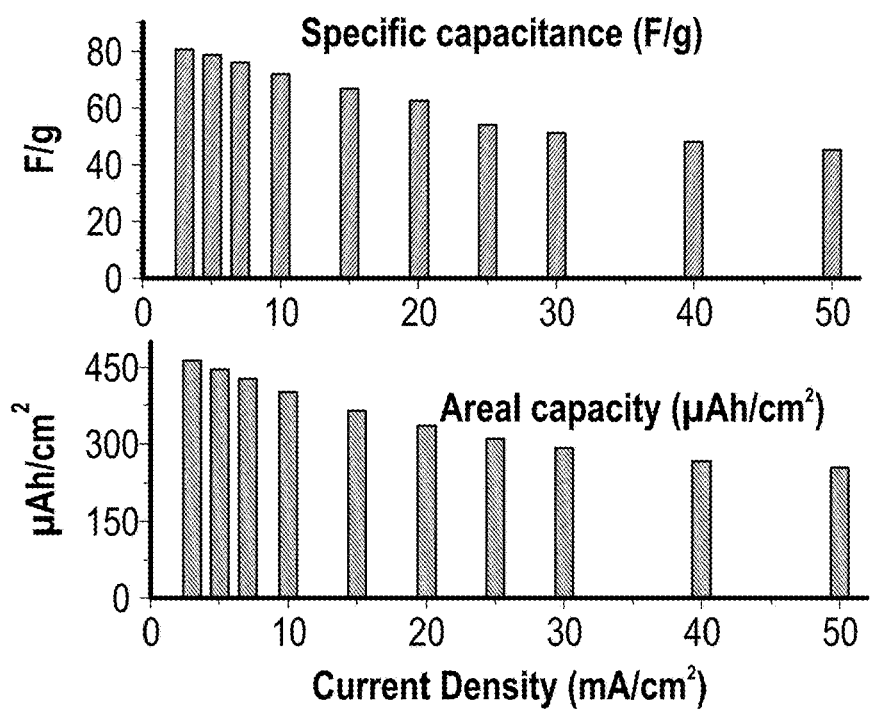
FIGS. 5F-5G show areal capacity and specific capacitance and rate capability calculated for the HSC.

The final mass of porous carbon on Ni-foam was adjusted after the charge balancing. The porous carbon negative electrode exhibits a rectangular CV curve, suggesting EDLC-type behavior in the potential window of 1.0-0 V. While the $Cu_{0.33}Co_{0.67}O_xS_y$-NFs sample shows clear redox peaks in the CV curves obtained between 0.15-0.45 V. Consequently, the optimal working voltage window of the fabricated HSC is likely around 0-1.45 V. To verify the above statement, the CV and GCD measurements were performed in the voltage windows of 0-1.0, 0-1.1, 0-1.2, 0-1.3, 0-1.4, and 0-1.45 V, at a scan rate of 30 mV s$^{-1}$ and current density of 25 mA cm$^{-2}$, respectively, as shown in FIGS. 5B and 5C. The CV and GCD curves show both EDLC-type and battery-type charge storage behavior, indicating accurate charge balancing on both electrodes. In the GCD curve of 0-1.45 V voltage window, HSC shows higher charge and discharge time compared to other voltage windows. This observation is consistent with the results acquired from the CV curves, suggesting the optimal working voltage of 0-1.45 V for the fabricated HSC. FIG. 5D shows CV curves of the HSC measured at different scan rates of 10-100 mV s$^{-1}$ exhibiting both EDLC-type and battery-type charge storage behavior. The area under the CV curves and the current density response increased along with the increase in scan rate. The shape of the CV curve for all scan rates remains similar indicating excellent reversibility of the HSC. Further, GCD experiments were carried out at different current values ranging from 3 to 50 mA cm$^{-2}$ as presented in FIG. 5E. The areal capacity and specific capacitance calculated for the HSC are shown in FIG. 5F. At 3, 5, 7, 10, 15, 20, 25, 30, 40, and 50 mA cm$^{-2}$ current density values, the HSC delivered a maximum areal capacity and specific capacitance of 462, 445, 426, 401, 363, 336, 310, 291, 267, 256 µAh/cm$^2$ and 81, 79, 76, 72, 67, 63, 54, 51, 47, 45 F/g, respectively.

Figure 5G:
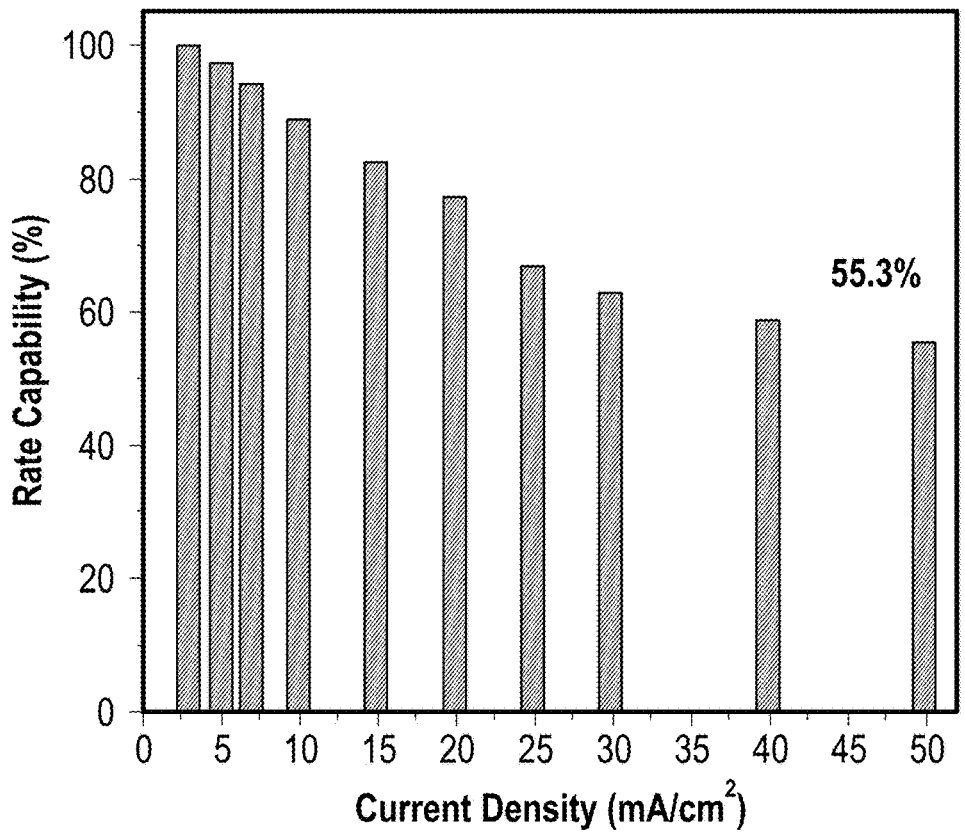
Figure 5H:
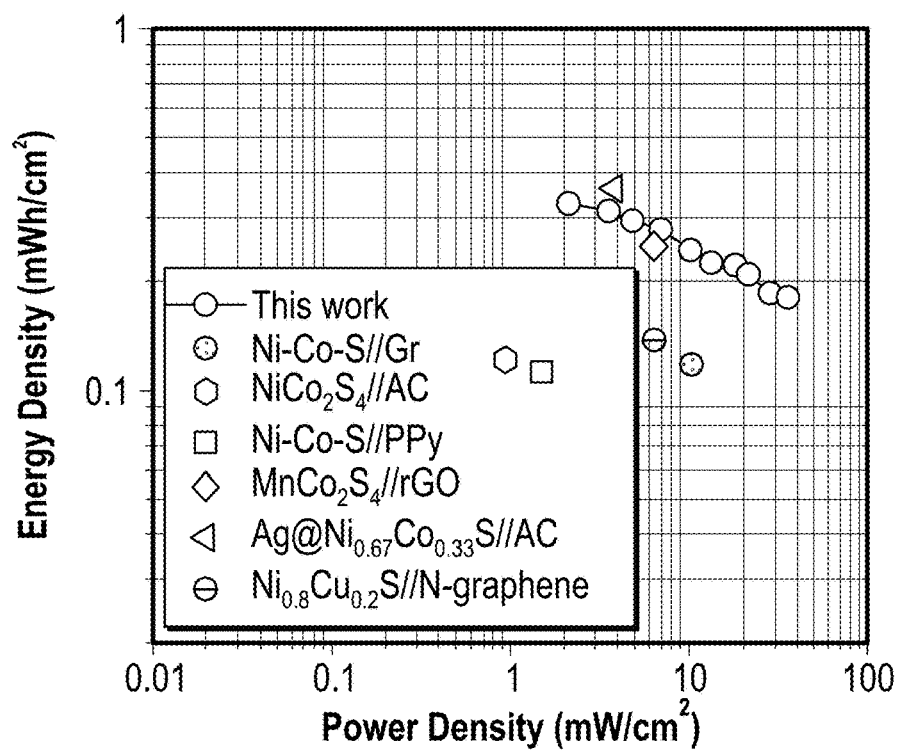
FIG. 5H-I show the Ragone plot and cyclic stability of the pouch-type HSC. The inset of FIG. 5I shows the Nyquist plot and its equivalent circuit of $Cu_{0.33}Co_{0.67}O_xS_y$-NFs/porous carbon HSC.
Figure 5I:
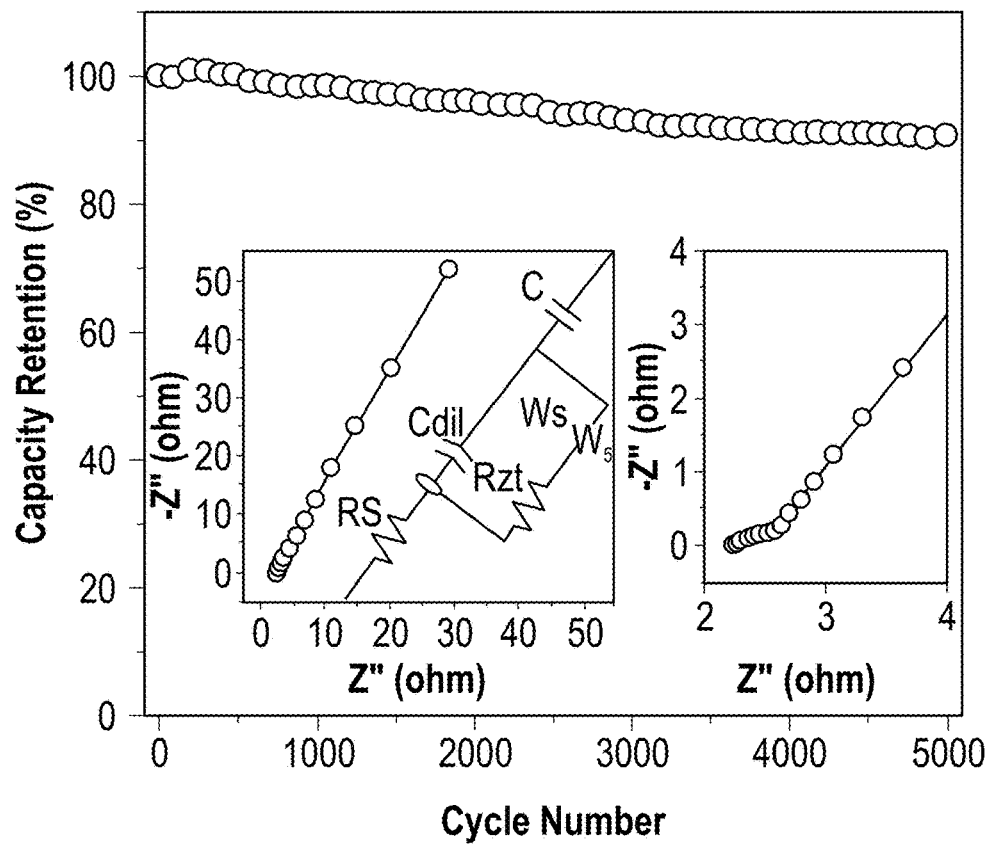
Figure 5J:
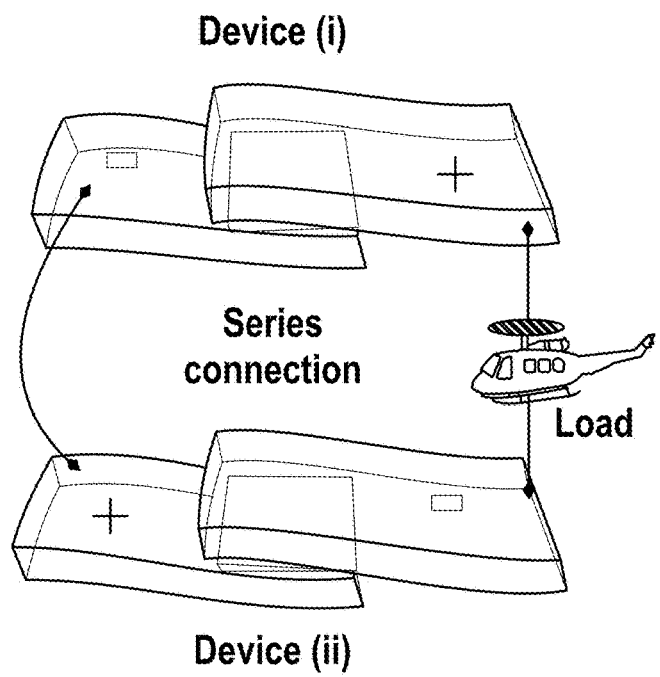
FIGS. 5J-5L show various other HSC device set-up configurations in accordance with the present invention.
Figure 5K:
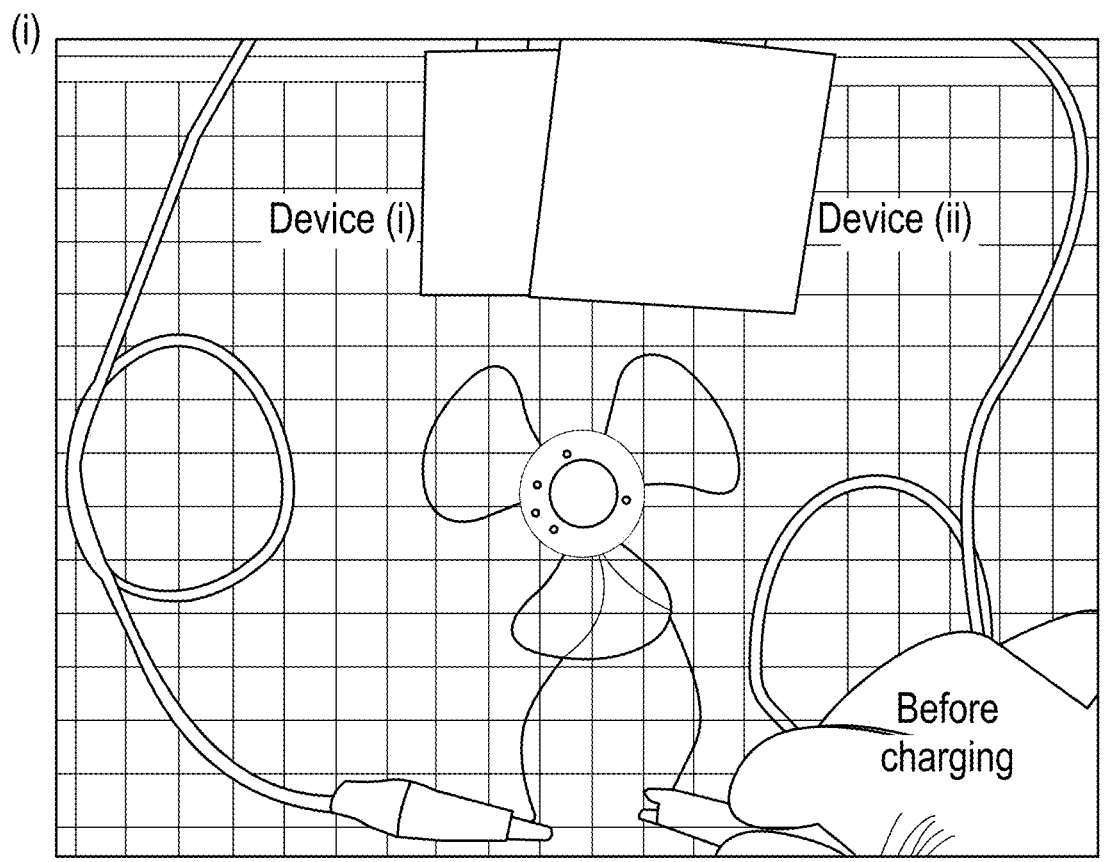
Figure 5L:
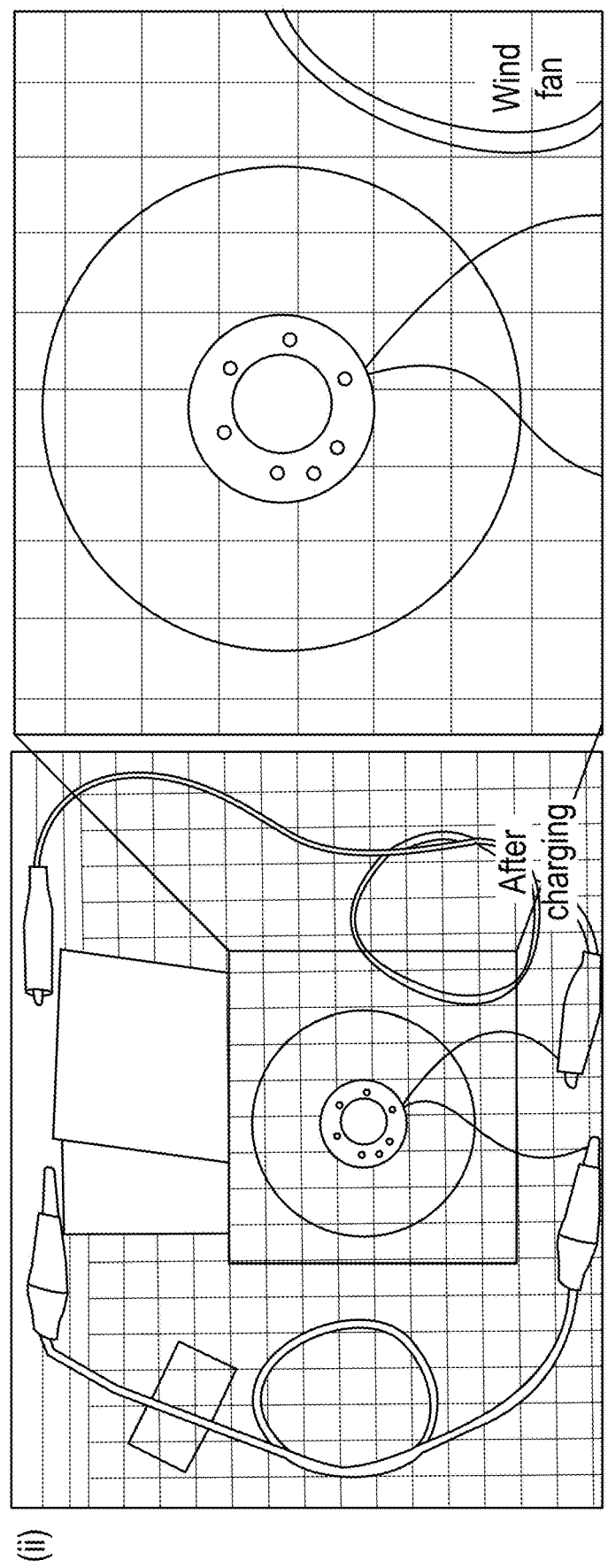

The HSC retains 55.3% of its initial areal capacity value indicating good rate capability (FIG. 5G). From the Ragone plot (FIG. 5H), the constructed HSC device exhibited a maximum areal energy density of 0.33 mWh/cm$^2$ at a power density of 2.1 W/cm$^2$. As evidenced by FIG. 5H, the HSC device maintained a good areal energy density of 0.18 mWh/cm$^2$ even at a higher power density of 35.7 W/cm$^2$. The acquired energy and power density values of HSC devices are notable since they are equivalent to or even greater than earlier reported asymmetric SCs/HSCs, for example, Ni—Co—S//Gr (0.118 mWh/cm$^2$ at 10.4 mW/cm$^2$), NiCo2S4//AC (0.121 mWh/cm$^2$ at 0.941 mW/cm$^2$), Ni—Co—S//PPY (0.112 mWh/cm$^2$ at 1.5 mW/cm$^2$), MnCo2S4//rGO (0.25 mWh/cm$^2$ at 6.4 mW/cm$^2$), Ag@ Ni0.67Co0.33S//AC (0.36 mWh/cm$^2$ at 3.805 mW/cm$^2$), and Ni0.8Cu0.2S//N-Gr (0.138 mWh/cm$^2$ at 6.4 mW/cm$^2$), respectively. Further, the stability of the fabricated HSC was examined by performing a cycling test at 30 mA cm$^{-2}$ current density for 5000 cycles, as presented in FIG. 5I. The HSC showed capacity retention of 90% from its initial value, indicating the excellent cycle life of the HSC. The inset of FIG. 5I illustrates the Nyquist plot suggesting negligible resistance for the assembled HSC. Form the equivalent circuit model (inset FIG. 5I), the estimated equivalent series resistance (Rs) is 2.23Ω and the charge transfer resistance (Rct) value is 0.4Ω. These lower values of $R_s$, $R_{ct}$ indicate that the electrode materials have the higher electrical conductivity and rapid charge transfer reactions. FIG. 5J illustrates the schematic of serially connected HSC devices to the wind fan. FIGS. 5K-5L shows the connections of HSC device with before charging and the performance of after charging of HSC device by rotating the wind fan, indicating the supercapacitors have the potential in powered the electronic devices. The overall result illustrates that the fabricated HSC can be used for real-time application.

The in-situ grown $Cu_{0.33}Co_{0.67}O_xS_y$ flower-like nanosheets (NFs) and nanoplates (NPs) were synthesized by a simple wet-chemical method at relatively low temperature. Morphological analyses confirmed the morphologies of oxysulfides and their formation. The high-intense CV curves show good redox behavior, which designates the battery-type nature of the electrode materials and has high charge storage performance. The $Cu_{0.33}Co_{0.67}O_xS_y$-NFs sample showed remarkable performance of specific capacity of 443.9 µAh/cm$^2$ at 3 mA cm$^{-2}$ and capacity retention of 95% as compared to the $Cu_{0.33}Co_{0.67}O_xS_y$-NPs. Further, HSC device delivered 0.33 mWh/cm$^2$ energy density and 2.1 mW/cm$^2$ power density at 3 mA cm$^{-2}$ current density with a 91% of capacity retention over 5000 cycles. The outstanding energy storage properties are an order of magnitude higher than the previously reported oxide/sulfide-based materials. The presented practical applications indicate the fabricated hybrid supercapacitor devices can be highly used for small-scale electronic applications. The low-temperature growth of multi-architectured $Cu_{0.33}Co_{0.67}O_xS_y$ materials could be further extended for other metal oxysulfide nanostructures for high-performance energy storage devices.

In accordance with the present invention, a new type of hybrid supercapacitor (HSC) is developed. The electrode materials with intrinsic synergistic properties should be selected to assist in the enhancement of energy storage performance in super-capacitor batteries. The advantages of low-temperature growth of Cu—Co oxysulfide nanostructures on porous Ni-foam with optimal Cu—Co atomic ratios includes being low-cost, easy synthesis process, timesaving, in-situ, and environmentally friendly, in addition to the morphological diversity of nanoflower-like morphology for $Cu_{0.33}Co_{0.67}O_xS_y$ and nanoplates for $Cu_{0.67}Co_{0.33}O_xS_y$. Further, the well-ordered 3D flower-like morphology with a high electroactive area can improve the electron intercalation and deintercalation, easy and fast diffusion of ions, resulting high specific capacitance and good cycling performance is obtained.

In an embodiment of the present invention, single-step and low-temperature metal oxysulfides are grown and used for hybrid supercapacitors. The fabricated HSC is found to exhibit excellent performance features such as higher charge and discharge time compared to other voltage windows (0-1.45V). Further, the area under the CV curves and the current density response increases along with the increase in scan rate. HSC delivered a maximum areal capacity of 462 µAh/cm$^2$, and a maximum areal energy density of 0.33 mWh/cm$^2$ at a power density of 2.1 W/cm$^2$. The HSC device before charging and the performance after charging of HSC device by rotating the wind fan, indicating the supercapacitors have the potential in powered the electronic devices. The results of the proposed fabrication method include low-cost, direct, and low-temperature synthesis of nanoflower-like morphology of $Cu_{0.33}Co_{0.67}O_xS_y$, and high-rate hybrid supercapacitor performance of $Cu_{0.33}Co_{0.67}O_xS_y$ nanoflowers for practical application.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the invention, defined in scope by the following claims.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A method of fabricating a copper-cobalt (Cu—Co) oxysulfide nanoarchitecture, the method comprising the steps of:

dissolving cobalt nitrate hexahydrate and copper nitrate in de-ionized (DI) water forming a growth solution; mixing disodium thiosulfate and urea to the formed growth solution;

immersing a pre-cleaned Ni-foam substrate in the growth solution forming a total solution; and transferring the total solution to a sealed glass bottle.

2. The method of claim 1, further comprising the steps of:

heating the sealed glass bottle in an oil bath, thereby forming a flower-like morphology sample of copper-cobalt oxysulfide; and cleaning and drying the formed sample of copper-cobalt oxysulfide.

3. The method of claim 2, wherein the formed sample of copper-cobalt oxysulfide is cleaned using de-ionized water and ethanol.

4. The method of claim 1, wherein 67 mM of cobalt nitrate hexahydrate and 33 mM of copper nitrate are dissolved in 50 ml of de-ionized (DI) water.

5. The method of claim 1, wherein 300 mM of disodium thiosulfate and 100 mM of urea is mixed into the formed growth solution.

6. The method of claim 1, wherein the Ni-foam substrate is pre-cleaned to eliminate oxide species on the Ni-foam substrate.

7. The method of claim 2, wherein the sealed glass bottle is heated at 70° C. for 3 hours.

8. The method of claim 2, wherein the formed sample of copper-cobalt oxysulfide is dried at 60° C. for 4 hours.

* * * * *